(12) United States Patent
Clarke

(10) Patent No.: US 12,555,985 B2
(45) Date of Patent: Feb. 17, 2026

(54) METHOD AND SYSTEM FOR INSTALLING POWER LINE DAMPERS

(71) Applicant: FT HOLDINGS INC., Calgary (CA)

(72) Inventor: Daniel John Clarke, Calgary (CA)

(73) Assignee: FT HOLDINGS INC., Calgary (CA)

( * ) Notice: Subject to any disclaimer, the term of this patent is extended or adjusted under 35 U.S.C. 154(b) by 833 days.

(21) Appl. No.: 17/940,907

(22) Filed: Sep. 8, 2022

(65) Prior Publication Data

US 2023/0072185 A1 Mar. 9, 2023

Related U.S. Application Data

(60) Provisional application No. 63/242,254, filed on Sep. 9, 2021.

(51) Int. Cl.
*H02G 1/02* (2006.01)
*B25J 5/00* (2006.01)
*H02G 7/14* (2006.01)

(52) U.S. Cl.
CPC .............. *H02G 1/02* (2013.01); *B25J 5/005* (2013.01); *H02G 7/14* (2013.01); *F16F 2226/04* (2013.01)

(58) Field of Classification Search
CPC ......... H02G 1/02; H02G 7/14; F16F 2226/04; B25J 5/005; Y10T 29/49174; Y10T 29/49181; Y10T 29/53209; Y10T 29/53235
See application file for complete search history.

(56) References Cited

U.S. PATENT DOCUMENTS

| 6,774,303 B1 * | 8/2004 | Brittain | H02G 7/14 174/40 R |
| 9,371,960 B2 * | 6/2016 | Lorimer | G01N 21/952 |
| 11,518,512 B2 * | 12/2022 | Groninga | H02G 1/02 |

FOREIGN PATENT DOCUMENTS

| CA | 2918088 A1 | 1/2015 |
| CN | 105896374 A | 8/2016 |
| CN | 106356760 B | 1/2017 |
| CN | 113211452 A | 8/2021 |

OTHER PUBLICATIONS

Guidelines for the Installation, Inspection, Maintenance and Repair of Structural Supports for Highway Signs, Luminaries, and Traffic Signals, FHWA NHI 05-36, US Department of Transportation, Mar. 2005.
Kiessling, Friedrich; Nefzger, Peter; Nolasco, Joao F.; Kantzyk, Ulf (2003), Overhead Powerlines, Springer, pp. 311-312, ISBN 3-540-00297-9.
Markiewics, M. (Nov. 29, 1995), "Optimum dynamic characteristics of Stockbridge dampers for dead-end spans", Journal of Sound and Vibration, 188 (2):243-256, Bibcode:1995JSV.
First Examiner's Requisition on CA App. 3,172,090 dated Dec. 7, 2023 (5 pages).

* cited by examiner

*Primary Examiner* — Donghai D Nguyen
(74) *Attorney, Agent, or Firm* — Foley & Lardner LLP

(57) ABSTRACT

A method and system for installing Stockbridge dampers on wires, such as power lines and guy wires, is described. The method and system include the use of a robotic Stockbridge damper installer onto the wires where the robotic installer is configured to place Stockbridge dampers on the wire as the robotic installer travels along the wire.

17 Claims, 26 Drawing Sheets

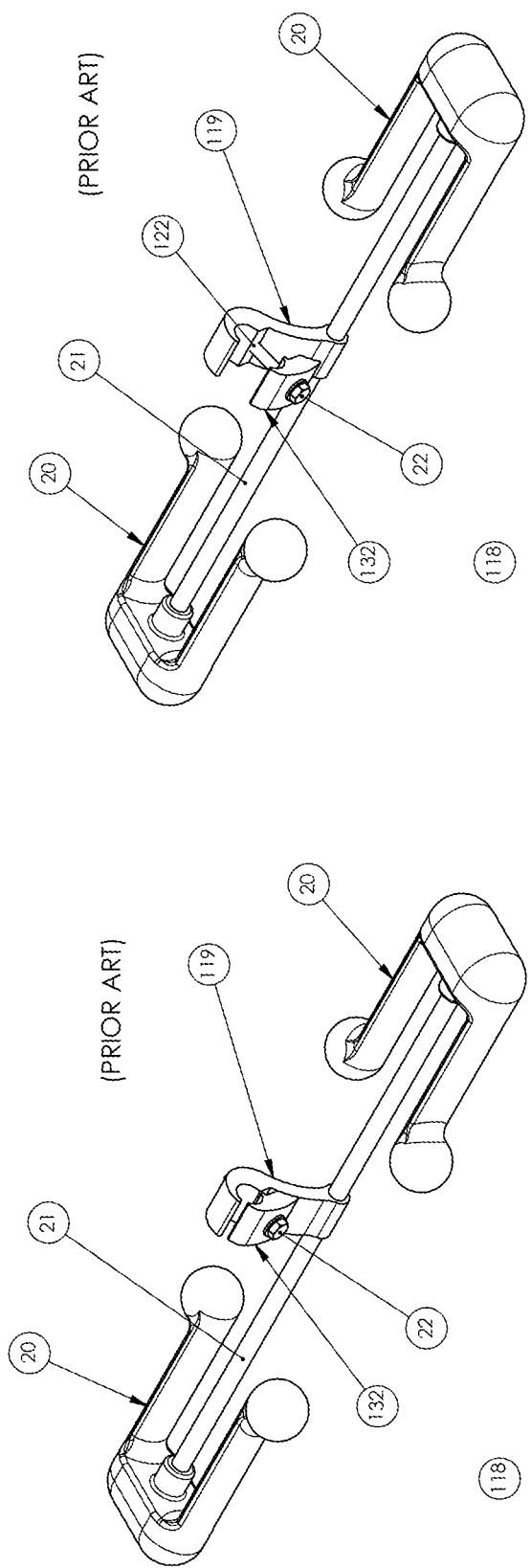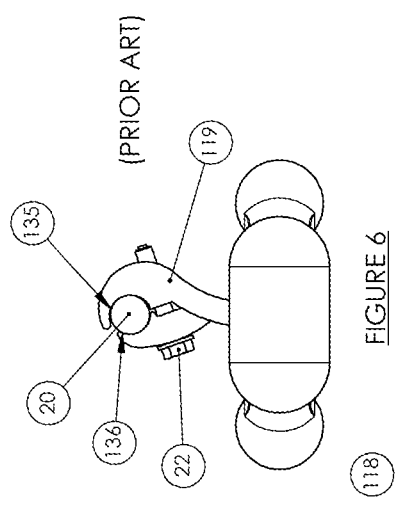
FIGURE 5 (PRIOR ART)
FIGURE 6 (PRIOR ART)
FIGURE 4 (PRIOR ART)

METHOD AND SYSTEM FOR INSTALLING POWER LINE DAMPERS

CROSS-REFERENCE TO RELATED APPLICATIONS

This application claims priority of U.S. provisional patent application Ser. No. 63/242,254 filed Sep. 9, 2021, which is incorporated by reference into this application in its entirety.

TECHNICAL FIELD

The present disclosure is related to the field of methods and systems for installing Stockbridge dampers on wires including, but not limited to, power lines and guy wires, in particular, systems and methods comprising a robotic installer configured to place Stockbridge dampers along the wire as the robotic installer travels along the wire.

BACKGROUND

A Stockbridge damper is a tuned mass damper used to suppress wind-induced vibrations on slender structures such as overhead power lines,[1] long cantilevered signs[2] and cable-stayed bridges. The dumbbell-shaped device consists of two masses at the ends of a short length of cable or flexible rod, which is clamped at its middle to the main cable. The damper is designed to dissipate the energy of oscillations in the main cable to an acceptable level.[3]

[1] Markiewicz, M. (29 Nov. 1995), "Optimum dynamic characteristics of Stockbridge dampers for dead-end spans", Journal of Sound and Vibration, 188 (2): 243-256, Bibcode:1995JSV . . . 188 . . . 243M, doi:10.1006/jsvi.1995.0589.
[2] Guidelines for the Installation, Inspection, Maintenance and Repair of Structural Supports for Highway Signs, Luminaries, and Traffic Signals, FHWA NHI 05-36, US Department of Transportation, March 2005, retrieved 12 Oct. 2008.
[3] Kiessling, Friedrich; Nefzger, Peter; Nolasco, Joao F.; Kaintzyk, Ulf (2003), Overhead Power Lines, Springer, pp. 311-312, ISBN 3-540-00297-9

FIG. 1 shows a perspective view of a prior art Type 1 Stockbridge damper 1 in the clamped position as configured when it is clamped to a power line 9, and FIG. 2 shows a perspective view of a Type 1 Stockbridge damper 1 in the relaxed configuration as configured prior to being installed on power line 9. For the purposes of this specification and the claims that follow, the term "power line" shall be interpreted to include guy wires and any other type of wire that Stockbridge dampers are attached to in addition to power lines. FIG. 3 shows the Type 1 Stockbridge damper 1 correctly installed on power line 9. One example of a Type 1 Stockbridge damper 1 is manufactured by Industrias Arruti S.A. of Amorebieta-Etxano, Biscay, Spain. Similar designs can also be manufactured by other organizations. Type 1 Stockbridge dampers 1 can comprise of two weights 20 connected to body 144 of Type 1 Stockbridge damper 1 with a cable 21. Body 144 can be fitted with two wings 145. Bolt 22 can be used to secure clamp 132 to body 144 by passing through clamp 132 and threading into female threaded hole 122 of body 144.

During typical installation, in order to secure Type 1 Stockbridge damper 1 to power line 9, bolt 22 is unthreaded from threaded hole 122 of body 144 until there is sufficient gap between concave surface 135 of body 144 and concave surface 136 of clamp 132. Power line 9 can then be inserted into the gap that exists between concave surface 135 of body 144 and concave surface 136 of clamp 132. Bolt 22 can then be tightened with a suitable tool that moves clamp 132 towards body 144. Once bolt 22 is tightened to a predetermined value, power line 9 is clamped tightly between concave surface 135 of body 144 and concave surface 136 of clamp 132 such that relative motion between Type 1 Stockbridge damper 1 and power line 9 is no longer possible. Once installed, Type 1 Stockbridge damper 1 reduces the magnitude of destructive wind induced Aeolian vibration in power line 9.

FIG. 4 shows a perspective view of a prior art Type 2 Stockbridge damper 118 in the clamped position as configured when it is clamped to power line 9, and FIG. 5 shows a perspective view of Type 2 Stockbridge damper 118 in the relaxed configuration as configured prior to being installed on power line 9. FIG. 6 shows Type 2 Stockbridge damper 118 correctly installed on power line 9. One example of a Type 2 Stockbridge damper 118 is manufactured by Preformed Line Products Company of Cleveland, Ohio, USA under the VORTX™ brand name. Similar designs can also be manufactured by other organizations. Type 2 Stockbridge damper 118 can comprise of two weights 20 connected to Type 2 Stockbridge damper body 119 with a cable 21. Bolt 22 can be used to secure clamp 132 to body 119 by passing through clamp 132 and threading into female threaded hole 122 of body 119.

During typical installation, in order to secure a Type 2 Stockbridge damper 118 to power line 9, bolt 22 is unthreaded from threaded hole 122 of body 119 until there is sufficient gap between concave surface 135 of body 119 and concave surface 136 of clamp 132. Power line 9 can then be inserted into the gap that exists between concave surface 135 of body 119 and concave surface 136 of clamp 132. Bolt 22 can then be tightened with a suitable tool which moves clamp 132 towards body 119. Once bolt 22 is tightened to a predetermined value, power line 9 is clamped tightly between concave surface 135 of body 119 and concave surface 136 of clamp 132 such that relative motion between Type 2 Stockbridge damper 118 and power line 9 is no longer possible. Once installed, Type 2 Stockbridge damper 118 reduces the magnitude of destructive wind induced Aeolian vibration in power line 9.

The only functional difference between Type 1 Stockbridge damper 1 and Type 2 Stockbridge damper 118 is that Type 1 Stockbridge damper body 144 is fitted with two wings 145, whereas Type 2 Stockbridge damper body 119 is not fitted with wings 145.

Currently, Stockbridge dampers 1 are installed on power lines 9, as shown in FIG. 7, manually by human workers transported to the elevation of the power lines (or guywire) by bucket truck or helicopters. Once at the power line (or guywire), the human worker must open the clamp for damper 1 using a tool and align damper 1 on power line (or guywire) 9. Then, the worker clamps the damper 1 on power line (or guywire) 9 using a tool ensuring that bolted connection 2 is tightened to the correct torque specification. This process is repeated for each installation of dampers 1. This method puts human workers in dangerous environments, requiring more strict safety measures to ensure worker safety.

It is, therefore, desirable to provide a method and system for installing Stockbridge dampers on power lines or guy wires safely and efficiently without putting human workers in dangerous working environments.

SUMMARY

Broadly stated, a method and system are provided for installing dampers on an electric power line or a guy wire. While the following specification, and the claims that follow, describe the installation of either Type 1 or Type 2

Stockbridge dampers on electric power lines or guy wires, it will be understood by those skilled in the art that the method and system described herein can be used or otherwise adapted for use with any type of functionally equivalent dampers that are used on electric power lines or guy wires.

Broadly stated, in some embodiments, a method can be provided for installing a Stockbridge damper onto a longitudinal length of a wire, the method comprising: placing a robotic Stockbridge damper installer on the wire, the robotic Stockbridge damper installer further configured to traverse along the longitudinal length of the wire, the robotic Stockbridge damper installer configured to hold at least one Stockbridge damper, the robotic Stockbridge damper installer loaded with the at least one Stockbridge damper; moving the robotic Stockbridge damper installer along the longitudinal length of the wire; and installing the at least one Stockbridge damper on the wire with the robotic Stockbridge damper installer at pre-determined locations on the wire.

Broadly stated, in some embodiments, the method can comprise lifting the robotic Stockbridge damper installer from the wire after the robotic Stockbridge damper installer has installed the at least one Stockbridge damper onto the wire.

Broadly stated, in some embodiments, the method can comprise returning the robotic Stockbridge damper installer to the ground surface.

Broadly stated, in some embodiments, the method can comprise re-loading one or more of the at least one Stockbridge damper onto the robotic Stockbridge damper installer and repeating the steps stated above.

Broadly stated, in some embodiments, the method can comprise performing maintenance on the robotic Stockbridge damper installer.

Broadly stated, in some embodiments, the method can comprise placing the robotic Stockbridge damper installer onto the wire with a lifter.

Broadly stated, in some embodiments, a system can be provided for installing a Stockbridge damper onto a longitudinal length of a wire, wherein the Stockbridge damper comprises a clamp configured to fasten to the wire with a breakaway bolt, the breakaway bolt comprising a breakaway section configured to shear off of the breakaway bolt at a predetermined torque, the system comprising: a frame configured to straddle the wire when placed thereupon, the frame further comprising opposing frame members extending downwardly therefrom; a pair of motorized wheels configured to traverse along the wire, each of the motorized wheels comprising an electric hub motor disposed therein; a lifting mechanism operatively coupling the pair of motorized wheels to the frame, the lifting mechanism configured to raise and lower the frame relative to the wire; at least one swingarm mechanism operatively coupled to the frame, the at least one swingarm mechanism configured to hold the at least one Stockbridge damper and further configured to rotate the at least one Stockbridge damper towards the wire for installation thereupon; and a battery configured to provide direct current ("DC") power, the battery operatively coupled to the pair of motorized wheels, to the lifting mechanism, and to the at least one swingarm mechanism to provide DC power thereto.

Broadly stated, in some embodiments, the lifting mechanism can comprise: a first DC electric servo motor operatively coupled to the frame, the first DC electric servo motor comprising a servo arm operatively coupled thereto; a pivot arm operatively coupling one of the pair of motorized wheels to the frame; and a linkage operatively coupling the pivot arm to the servo arm, wherein operation of the first DC electric servo motor causes the servo arm to rotate and move the pivot arm towards or away from the frame to thereby raise or lower the frame.

Broadly stated, in some embodiments, the at least one swingarm mechanism can comprise: a second DC electric servo motor disposed on the frame; a swingarm pivotally coupled to the second DC electric servo motor; a clamp arm pivotally coupled to the swingarm, the combination of the swingarm and the clamp arm configured to hold one of the at least one Stockbridge damper, the clamp arm further comprising a biasing member configured to pivot the clamp arm towards the swingarm; and a rotary impact driver operatively coupled to the swingarm, the rotary impact driver configured to clamp the at least one Stockbridge damper onto the wire when the at least one swingarm mechanism is rotated to install the at least one Stockbridge damper onto the wire.

Broadly stated, in some embodiments, the rotary impact driver can comprise a socket configured to rotationally engage the breakaway section disposed on the breakaway bolt, whereupon operation of the rotary impact driver rotates the breakaway bolt to tighten the clamp to the wire until the breakaway section shears off of the breakaway bolt at the predetermined torque.

Broadly stated, in some embodiments, the system can comprise a lifter configured to place the robotic Stockbridge damper installer on the wire.

Broadly stated, in some embodiments, the lifter can comprise one or more of an unmanned aerial vehicle, a crane and a bucket truck.

Broadly stated, in some embodiments, the wire can comprise an electric power line or a guy wire.

BRIEF DESCRIPTION OF THE DRAWINGS

FIG. 4 is a perspective view depicting a prior art Type 2 Stockbridge damper with the cable clamp closed.

FIG. 5 is a perspective view depicting the prior art Type 2 Stockbridge damper of FIG. 4 with the cable clamp open.

FIG. 6 is an end elevation view depicting the prior art Type 2 Stockbridge damper of FIG. 4.

DETAILED DESCRIPTION OF EMBODIMENTS

Figure 2:
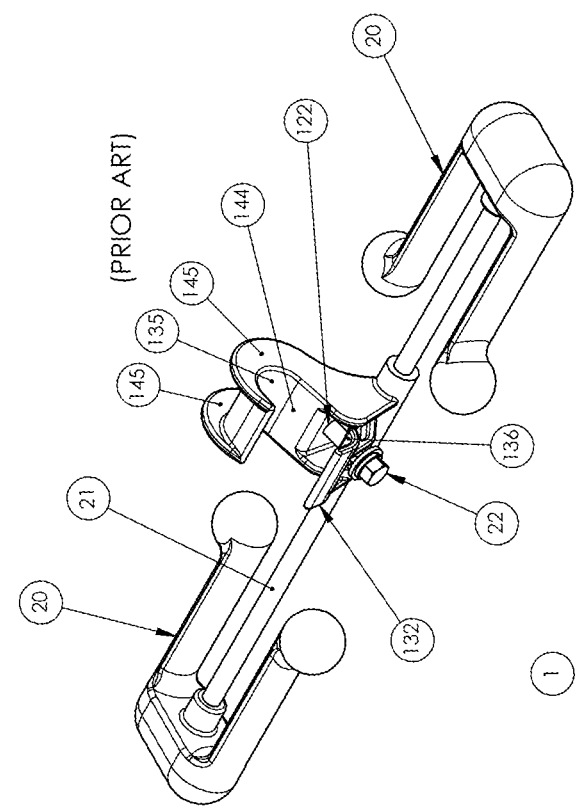
FIG. 2 is a perspective view depicting the prior art Type 1 Stockbridge damper of FIG. 1 with the cable clamp open.
Figure 3:
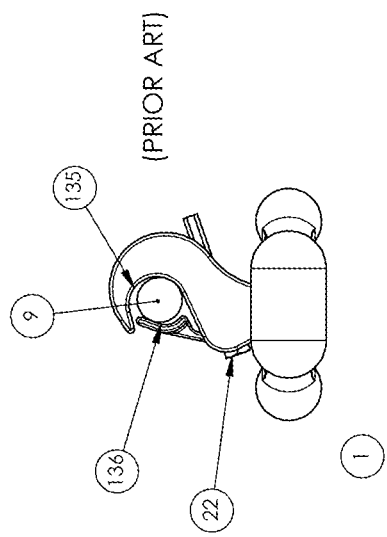
FIG. 3 is an end elevation view depicting the prior art Type 1 Stockbridge damper of FIG. 1.
Figure 1:
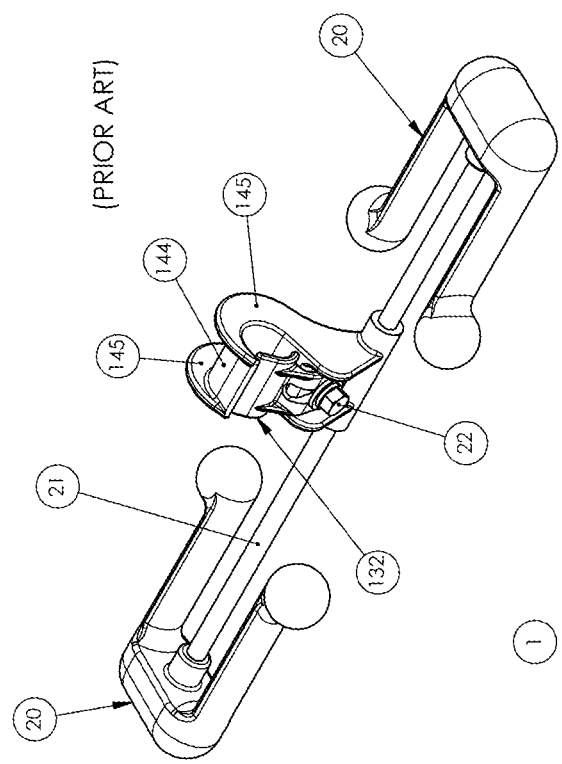
FIG. 1 is a perspective view depicting a prior art Type 1 Stockbridge damper with the cable clamp closed.
Figure 7:
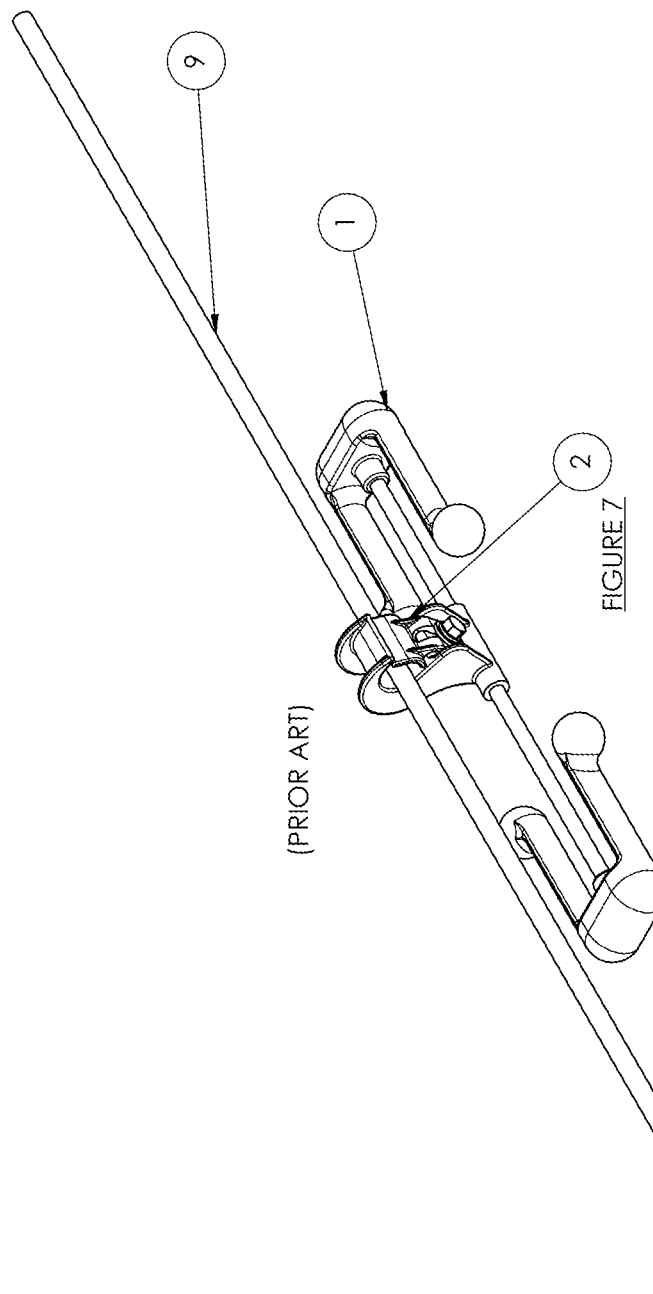
FIG. 7 is a perspective view depicting the prior art Type 1 Stockbridge damper of FIG. 1 installed on a power line.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment can also be included in other embodiments but is not necessarily included. Thus, the present technology can include a variety of combinations and/or integrations of the embodiments described herein.

The presently disclosed subject matter is illustrated by specific but non-limiting examples throughout this description. The examples may include compilations of data that are representative of data gathered at various times during the course of development and experimentation related to the present invention(s). Each example is provided by way of explanation of the present disclosure and is not a limitation thereon. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

While the following terms used herein are believed to be well understood by one of ordinary skill in the art, definitions are set forth to facilitate explanation of the presently disclosed subject matter.

Unless defined otherwise, all technical and scientific terms used herein have the same meaning as commonly understood by one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims.

Unless otherwise indicated, all numbers expressing quantities, properties, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently disclosed subject matter.

As used herein, the term "about", when referring to a value or to an amount of mass, weight, time, volume, concentration or percentage is meant to encompass variations of in some embodiments +/−50%, in some embodiments +/−40%, in some embodiments +/−30%, in some embodiments +/−20%, in some embodiments +/−10%, in some embodiments +/−5%, in some embodiments +/−1%, in some embodiments +/−0.5%, and in some embodiments +/−0.1% from the specified amount, as such variations are appropriate to perform the disclosed method.

Alternatively, the terms "about" or "approximately" can mean within an acceptable error range for the particular value as determined by one of ordinary skill in the art, which will depend in part on how the value is measured or determined, i.e., the limitations of the measurement system. For example, "about" can mean within 3, or more than 3, standard deviations, per the practice in the art. Alternatively, "about" can mean a range of up to 20%, preferably up to 10%, more preferably up to 5%, and more preferably still up to 1 of a given value. Alternatively, particularly with respect to biological systems or processes, the term can mean within an order of magnitude, preferably within 5-fold, and more preferably within 2-fold, of a value. Unless otherwise indicated, all numbers expressing quantities, properties, and so forth used in the specification and claims are to be understood as being modified in all instances by the term "about". And so, the numerical parameters set forth in this specification and claims are approximations that can vary depending upon the desired properties sought to be obtained by the presently disclosed subject matter.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Figure 9:
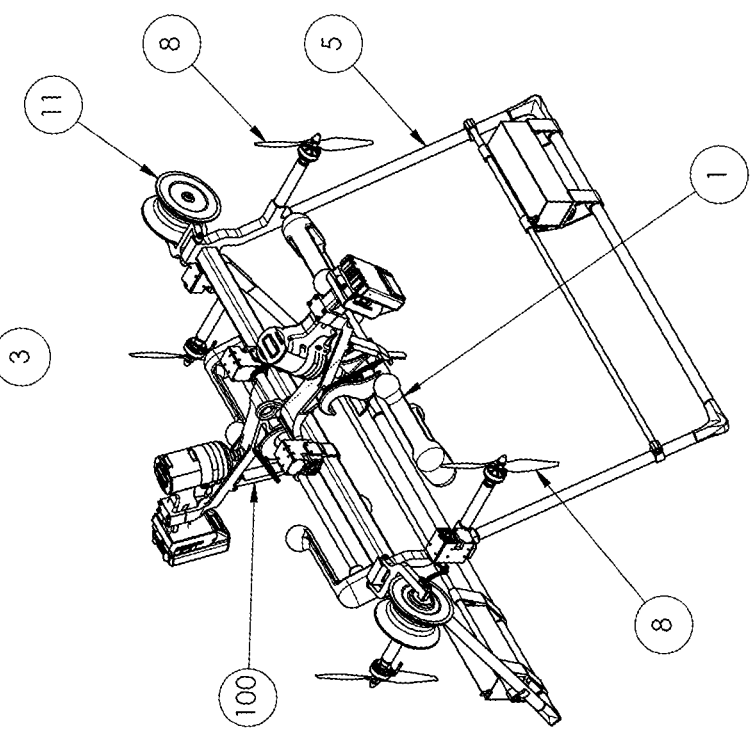
FIG. 9 is a perspective view depicting the robotic Stockbridge damper installer of FIG. 8 loaded with Stockbridge dampers.
Figure 8:
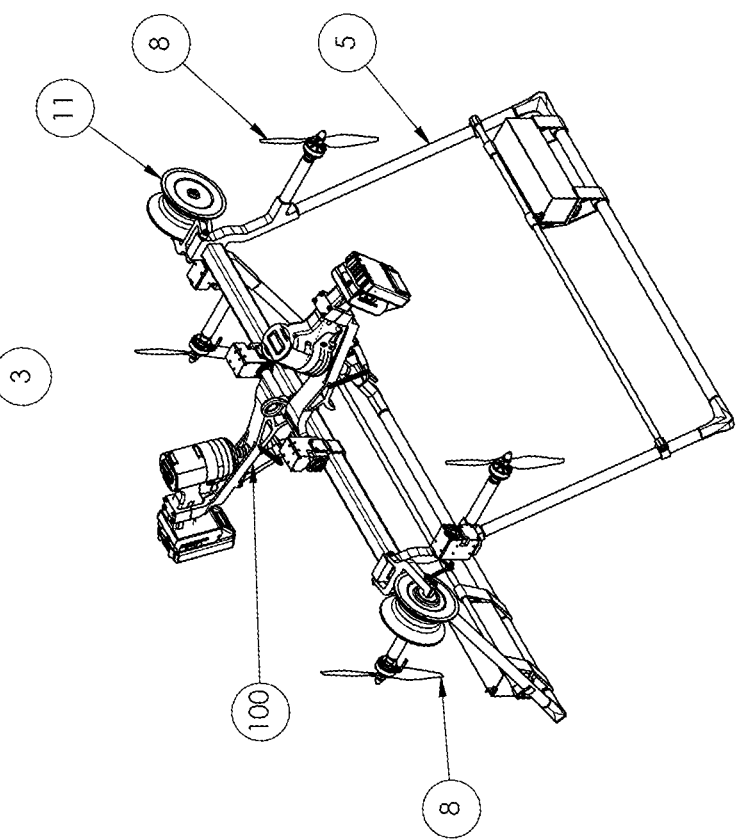
FIG. 8 is a perspective view depicting a robotic Stockbridge damper installer.
Figure 10:
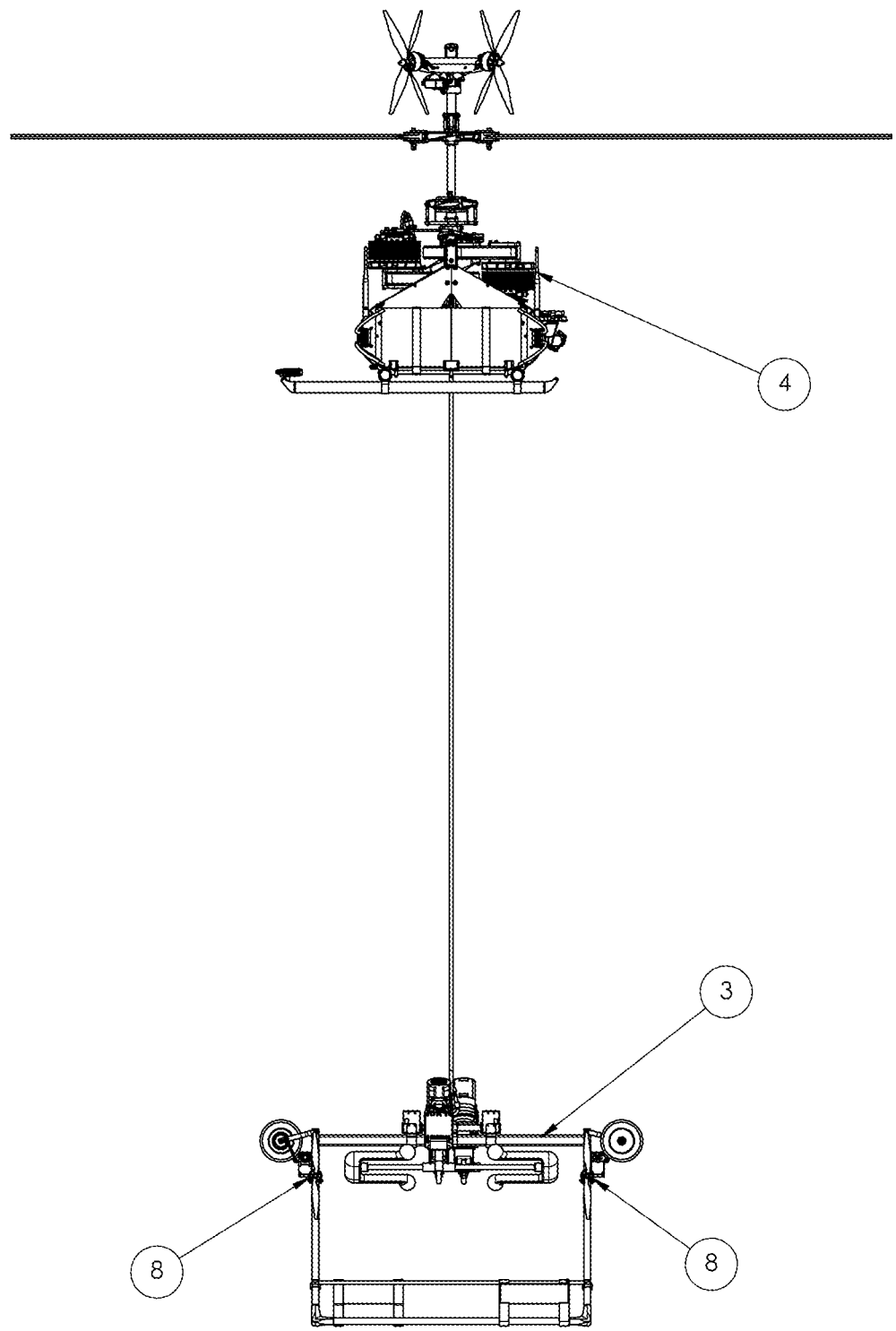
FIG. 10 is an elevation view depicting an Unmanned Aerial Vehicle ("UAV") lifting the robotic Stockbridge damper installer of FIG. 9.
Figure 11:
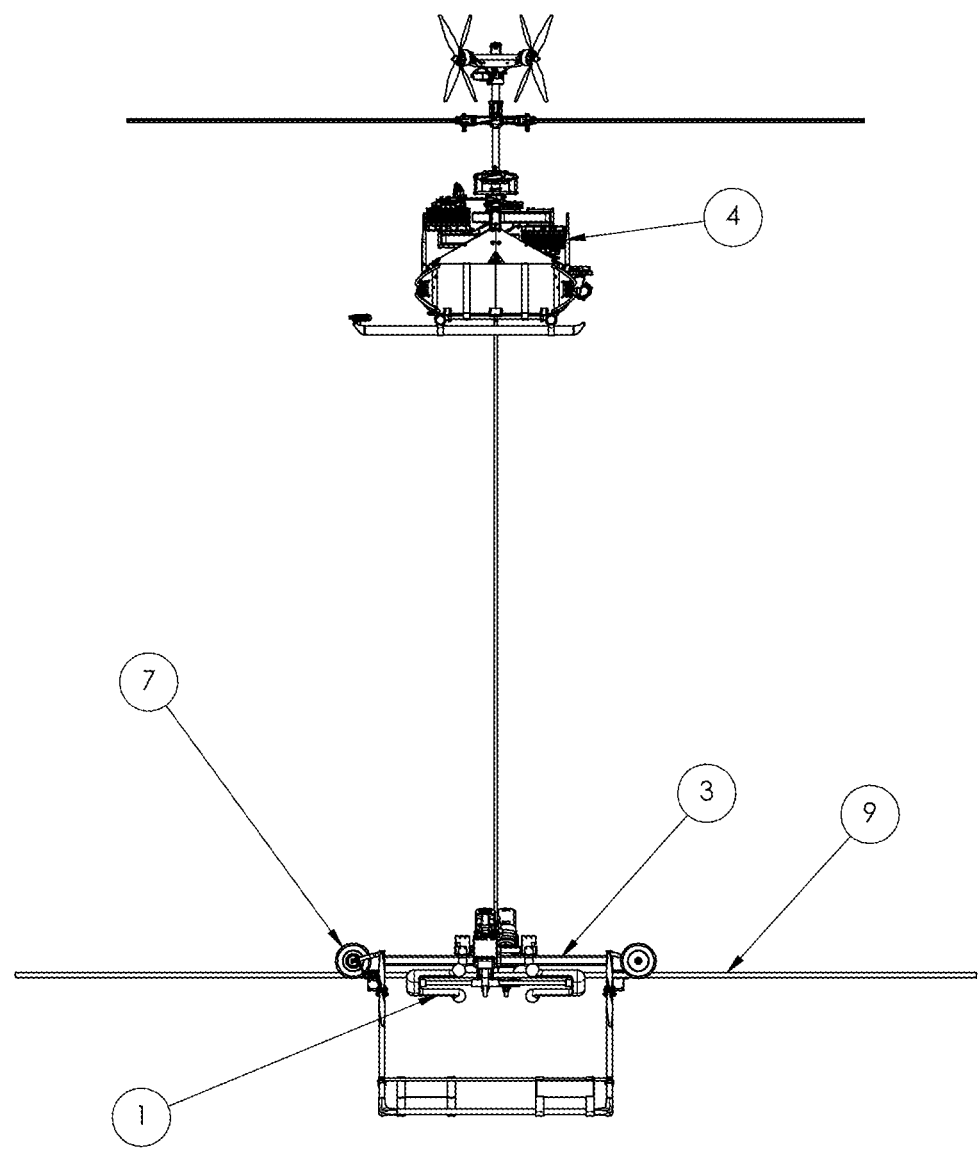
FIG. 11 is an elevation view depicting the UAV of FIG. 10 placing the robotic Stockbridge damper installer of FIG. 9 onto a power line.
Figure 13:
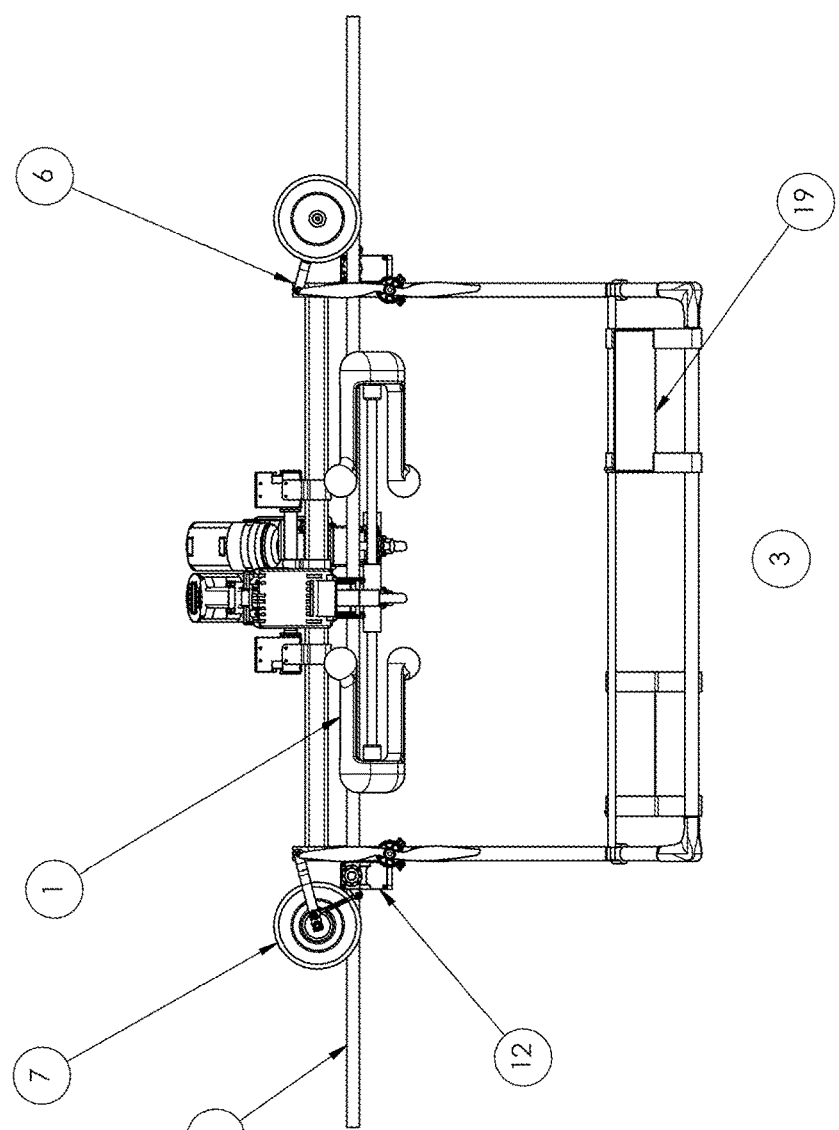
FIG. 13 is a side elevation view depicting the robotic Stockbridge damper installer of FIG. 12.
Figure 12:
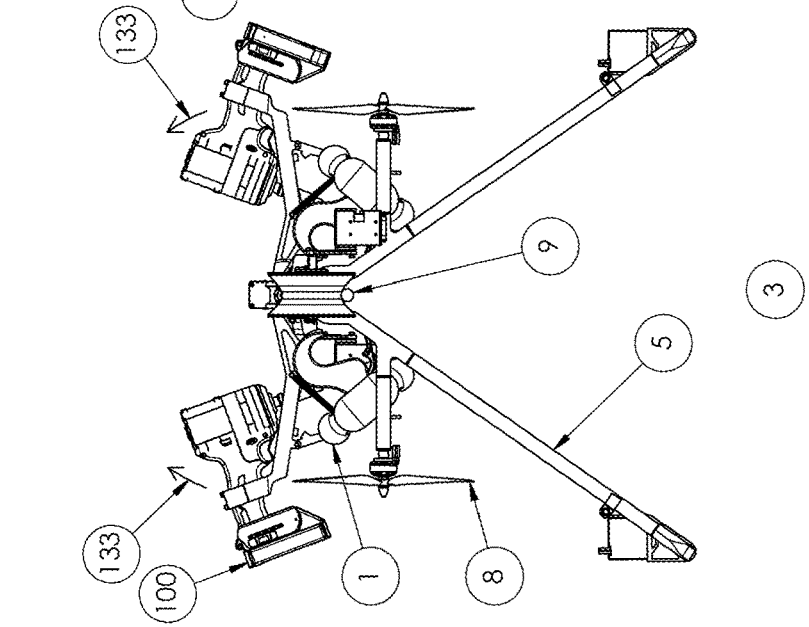
FIG. 12 is an end elevation view depicting the robotic Stockbridge damper installer of FIG. 11.
Figure 40:
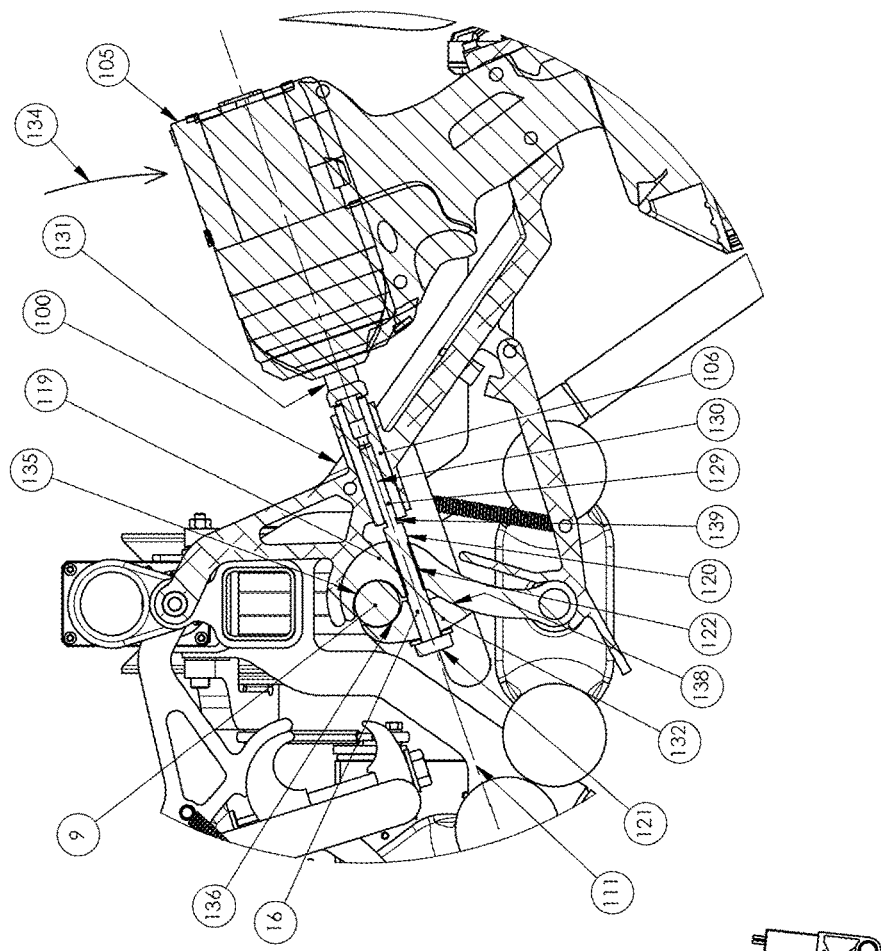
FIG. 40 is a close-up, cross-section elevation view depicting Detail A of FIG. 39.
Figure 42:
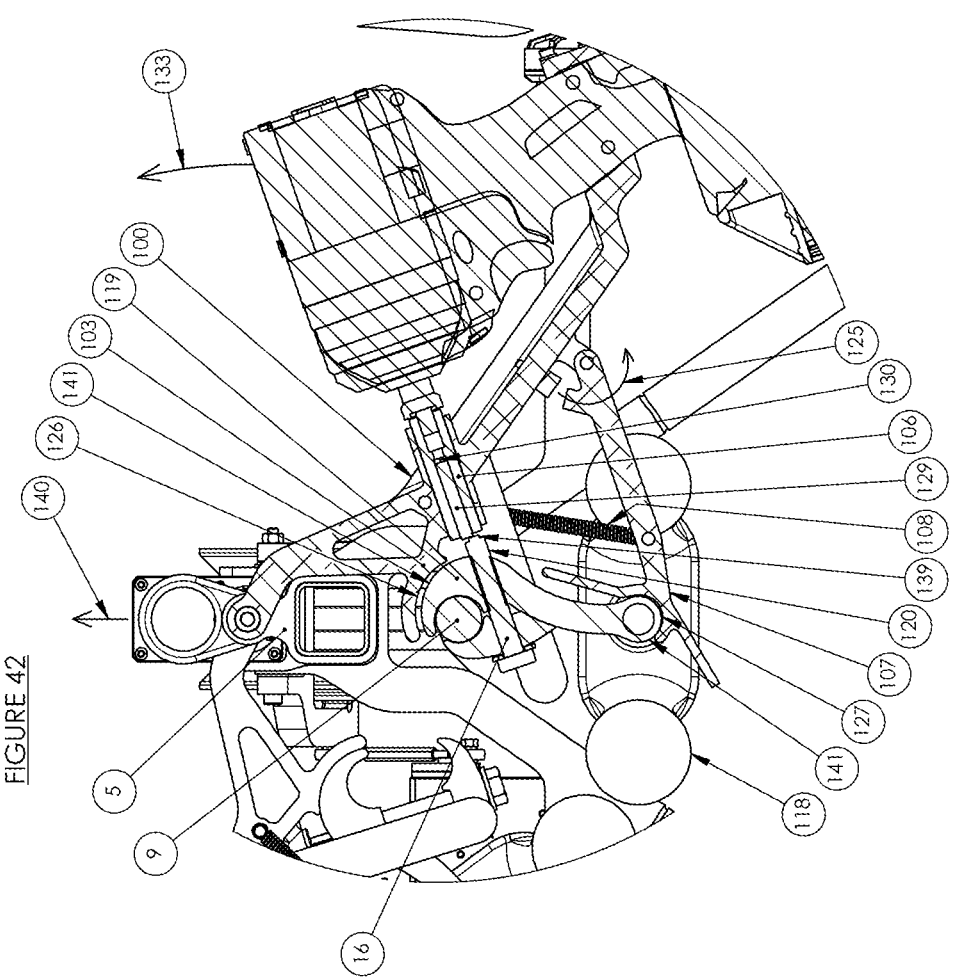
FIG. 42 is a close-up, cross-section elevation view depicting Detail A of FIG. 41.
Figure 41:
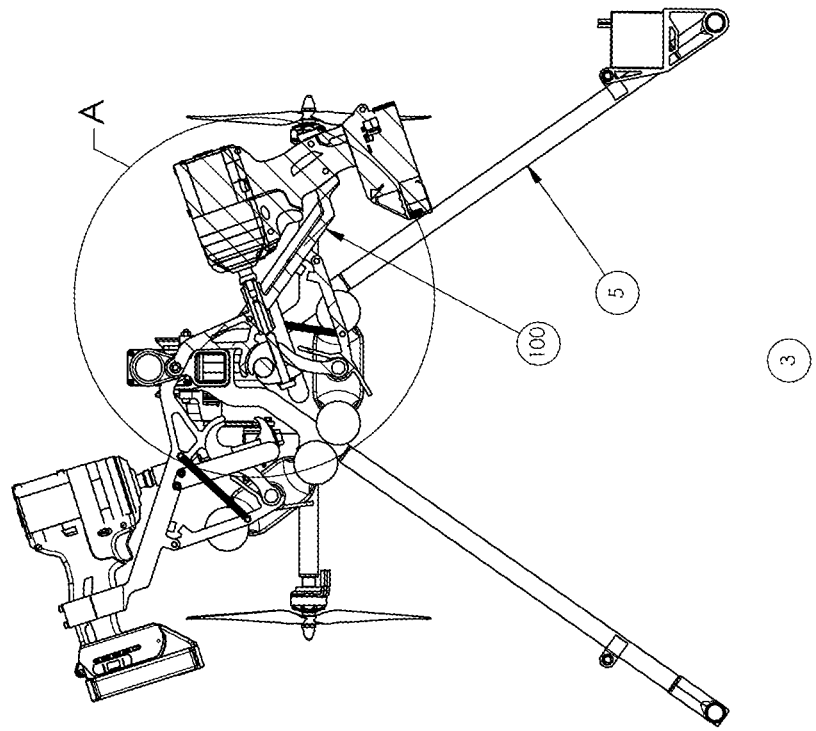
FIG. 41 is a cross-section end elevation view depicting the robotic Stockbridge damper installer of FIG. 39 after the Stockbridge damper has been clamped onto the power line.
Figure 44:
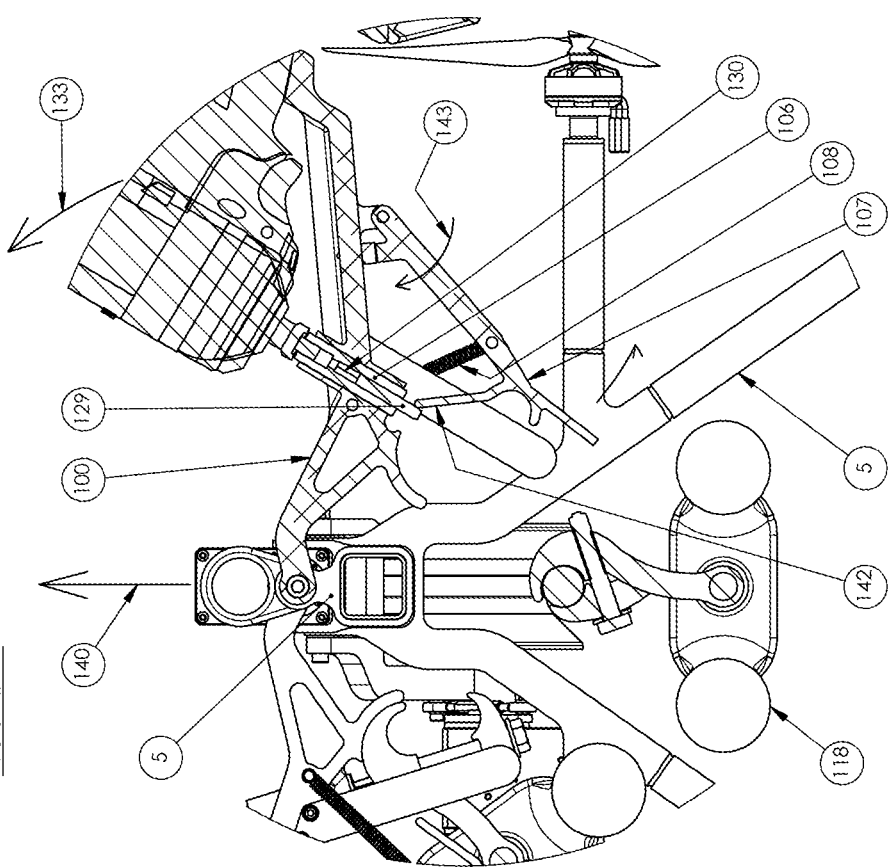
FIG. 44 is a close-up, cross-section elevation view depicting Detail A of FIG. 43.
Figure 43:
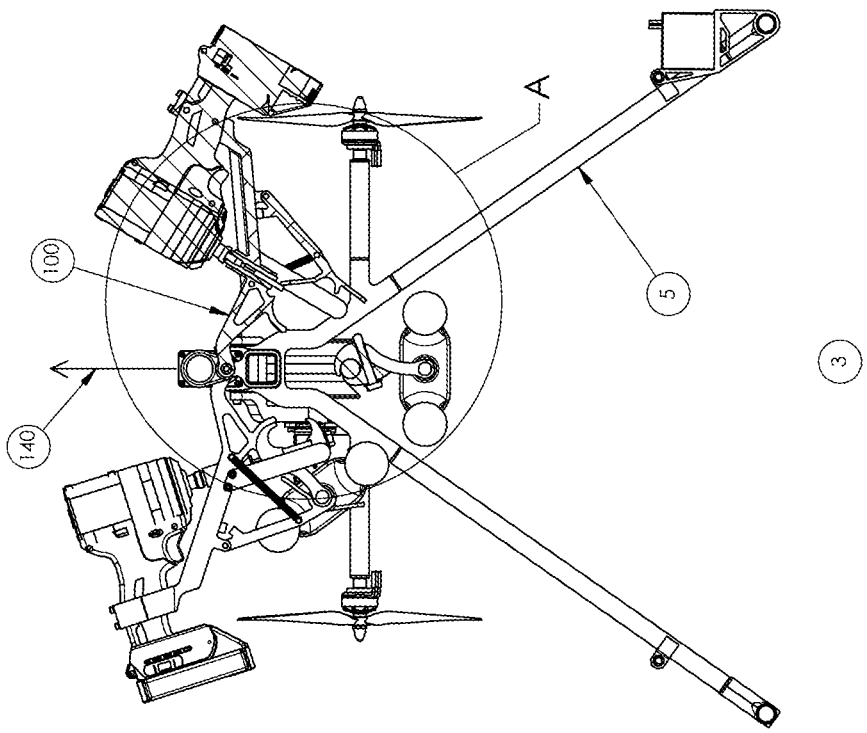
FIG. 43 is a cross-section end elevation view depicting the robotic Stockbridge damper installer of FIG. 41 with the swingarm mechanisms rotating back after the installation of the Stockbridge damper on the power line.

In some embodiments, the process of installing Stockbridge dampers 1 using robotic Stockbridge damper installer 3 (hereinafter referred to as "Stockfly 3") can greatly increase the efficiency of installation thereof. In some embodiments, Stockfly 3 can be placed on power line 9 using an unmanned aerial vehicle or helicopter. As a preliminary step to preparing Stockbridge dampers 1 for installation, existing bolt 22 is removed from Stockbridge damper 1 and then replaced with breakaway bolt 16. As shown in FIGS. 29 to 32, Stockbridge dampers 1 can be installed into Stockfly 3 by opening clamp arm 107 on swingarm mechanism 100 and attaching breakaway bolt 16 to rotary impact driver 105 when the unit is unpowered and at ground level (as described in more detail below). FIGS. 8 and 9 illustrate Stockfly 3 without and with dampers 1 loaded thereon, respectively. Once loaded, Stockfly 3 can be powered on and lifted to the power line height using an unmanned aerial vehicle ("UAV") 4 or helicopter as shown in FIG. 10. In some embodiments UAV 4 can position itself and attached Stockfly 3 over power line 9. In some embodiments, Stockfly 3 can align itself with power line 9 (or guywire) using its stability control system and control propellers 8, angled frame 5 and custom shaped V wheels 11. Then, UAV 4 or helicopter can gently lower Stockfly 3 onto power line 9 (or guywire) as shown in FIG. 11. Stockfly 3 can now be passively stabilized by its battery 19 placement creating a low center of gravity relative to power line 9. Once Stockfly 3 is on power line 9, it can use its position-controlled electric hub motors 7 to precisely position itself at the location on power line 9 for installation of a Stockbridge damper 1. Referring to FIGS. 40 to 42, once at the damper installation location on power line 9, one of two swingarm mechanisms 100 can rotate into place, shown as direction arrow 134 in FIGS. 38 and 40, positioning damper 1 on power line 9. Once damper 1 is in place, rotary impact driver 105 can torque the Stockbridge damper clamping mechanism 2 until the torque rated breakaway bolt 16 breaks (as described in more detail below). When breakaway bolt 16 breaks, swingarm mechanism 100 can rotate away, along direction 133, from installed damper 1 releasing it from spring-loaded clamp arm 109, as shown in FIGS. 43 to 44 and described in more detail below. Once swingarm mechanism 100 is clear of damper 1, Stockfly 3 can lift frame 5 and swingarm mechanisms 100 clear of damper 1 using its lifting mechanism 6, as shown in FIGS. 15 to 18 and 43 to 44 and described in more detail below. In some embodiments, Stockfly 3 can then drive over installed damper 1 to proceed and install the remaining dampers 1 in its inventory on power line 9 using the same process described above. When Stockfly 3 has no remaining dampers 1 in its inventory or has installed all required dampers 1, UAV 4 can lift Stockfly 3 off power line 9 (or guywire) and safely lower it down to ground level so it can be refitted with dampers 1 to repeat the entire process.

Figure 14:
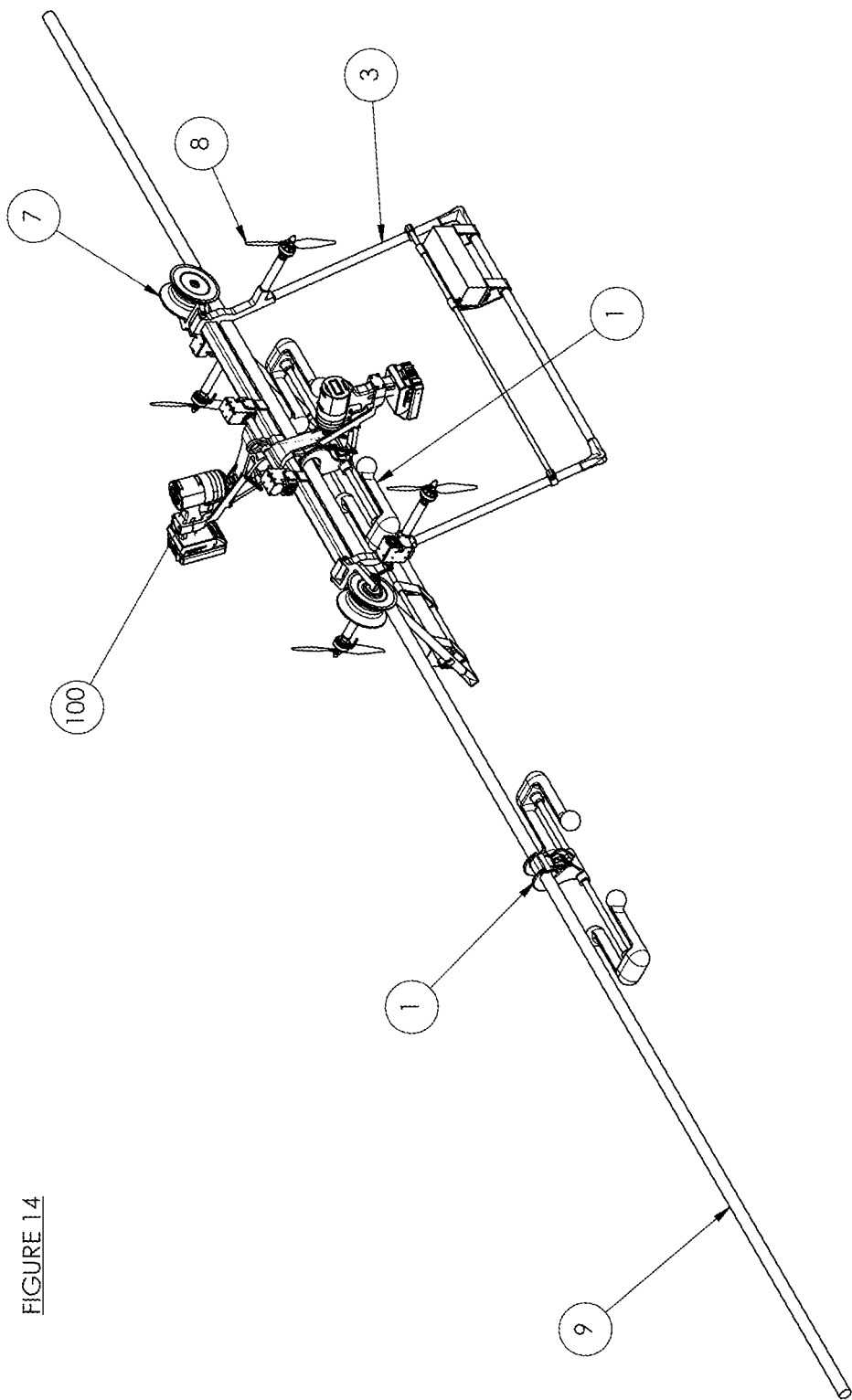
FIG. 14 is a perspective view depicting the robotic Stockbridge damper installer of FIG. 12 after installing a Type 1 Stockbridge damper on the power line.
Figure 38:
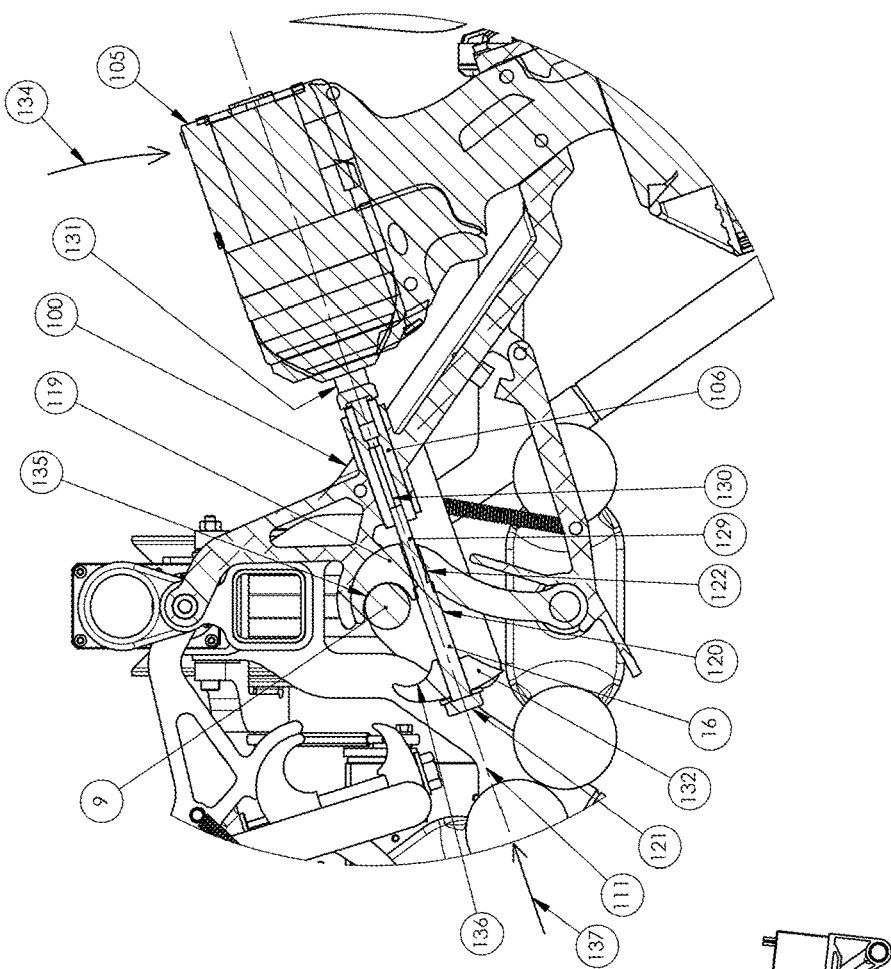
FIG. 38 is a close-up, cross-section elevation view depicting Detail A of FIG. 37.

In some embodiments, a human worker must remove existing bolt 22 in Stockbridge damper 1 and replace it with breakaway bolt 16 prior to the installation of damper 1. A human worker must install Stockbridge damper(s) 1 into Stockfly 3 by opening clamp arm 107 on swingarm mechanism 100 and attaching breakaway bolt 16 to rotary impact driver 105 when Stockfly 3 is unpowered and at ground level (as shown in FIGS. 29 to 32 and described in more detail below). In some embodiments, the robotic Stockbridge damper installer can be configured as, or integrated with, an unmanned aerial vehicle (UAV) by comprising powered propellers 18 disposed thereon to become Stockfly UAV 17, as shown in FIGS. 19 to 24. Once Stockfly UAV 17 is loaded with dampers 1, Stockfly UAV 17 can be powered on and fly to the power line height. Stockfly UAV 17 can position itself over power line 9. Stockfly UAV 17 can align itself with power line 9 (or guywire) using its stability control system and powered propellers 18, angled frame 5, and custom shaped V wheels 11. Then, Stockfly UAV 17 can gently lower itself onto power line 9 (or guywire). Once positioned on power line 9, Stockfly UAV 17 can be passively stabilized by its battery 19 placement creating a low center of gravity relative to power line 9. Once Stockfly UAV 17 is on power line 9, Stockfly UAV 17 can use its position-controlled electric hub motors 7 to move along power line 9 and precisely position itself at the location for installation of a Stockbridge damper 1, as shown in FIG. 14. Once at the location, one of the two swingarm mechanisms 100 can rotate into place along direction arrow 134, as shown in FIGS. 38 and 40, to ready itself to place damper 1 on power line 9. Once damper 1 is in place to attach to power line 9, impact driver mechanism 105 can torque clamping mechanism 2 until breakaway bolt 16 breaks at its rated breaking torque (as shown in FIGS. 40 to 42 and described in more detail below). When breakaway bolt 16 breaks, swingarm mechanism 100 can then rotate away along direction 133 from installed damper 1 thereby releasing it from spring-loaded clamp arm 109 (as shown in FIGS. 43 to 44 and described in more detail below). Once swingarm mechanism 100 is clear of installed damper 1, Stockfly UAV 17 can lift frame 5 and swingarm mechanisms 100 clear of installed damper 1 using its lifting mechanism 6, as shown in FIGS. 15 to 18 and 43 to 44 and described in more detail below. In some embodiments, Stockfly UAV 17 then drives over installed damper 1 along power line 9 to proceed and install the remaining dampers 1 in its inventory using the same process described above. When Stockfly UAV 17 has no remaining dampers 1 in its inventory or has installed all required dampers 1, Stockfly UAV 17 can lift itself off power line (or guywire) 9 and can safely fly down to ground level to repeat the entire process.

Figure 25:
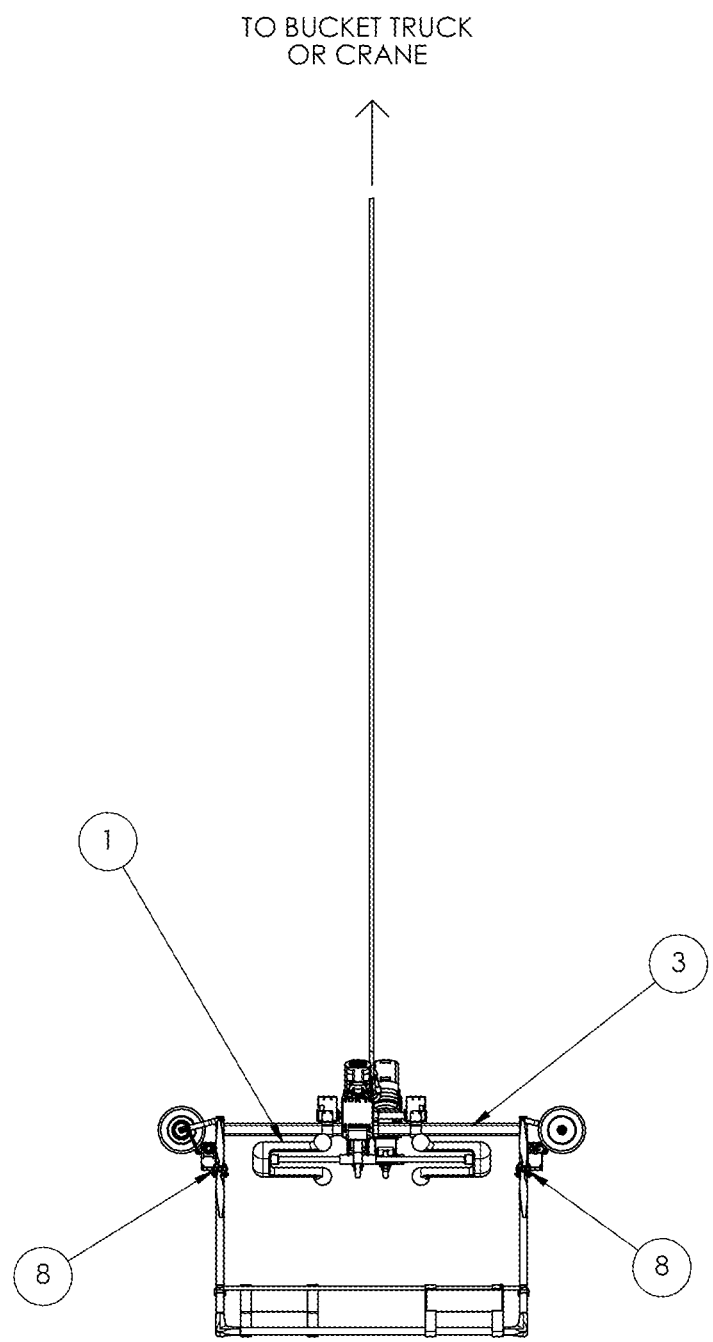
FIG. 25 is a side elevation view depicting a robotic Stockbridge damper installer loaded with Stockbridge dampers being raised to be placed onto a power line.
Figure 26:
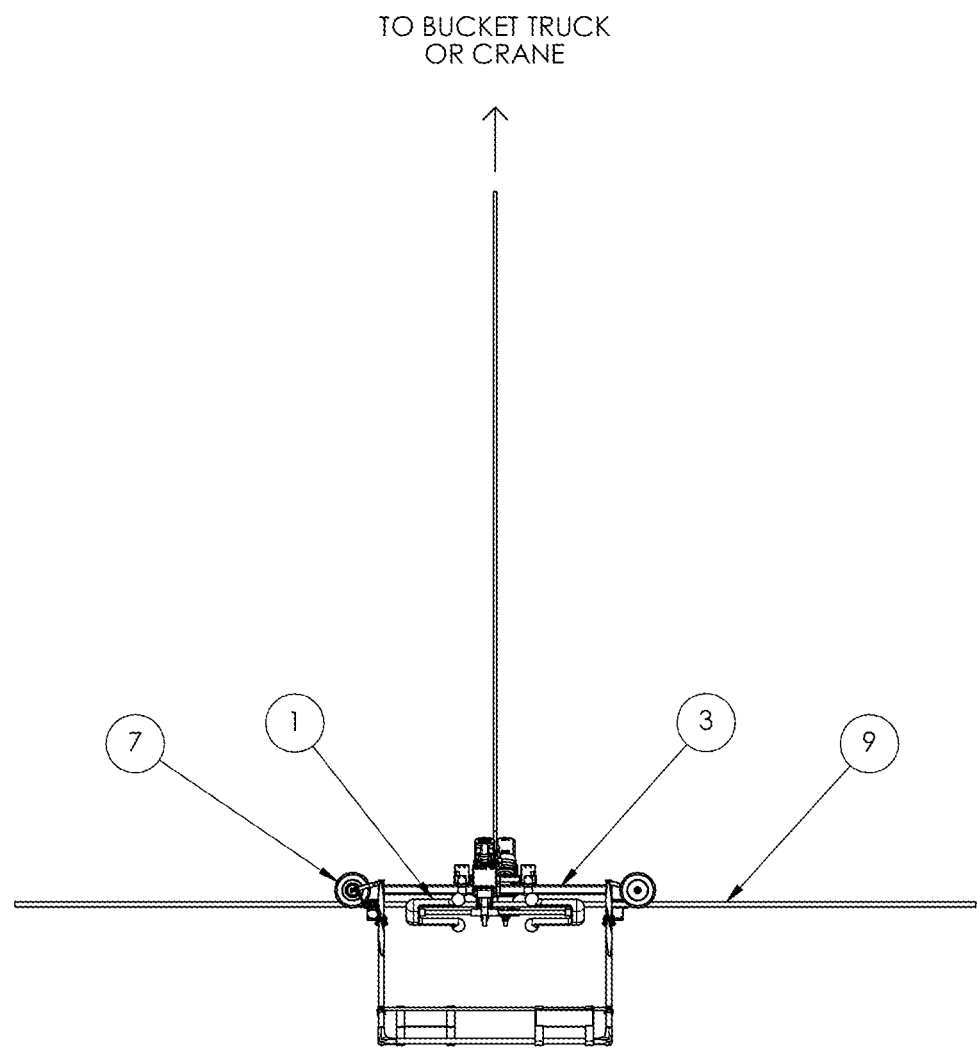
FIG. 26 is a side elevation view depicting the robotic Stockbridge damper installer of FIG. 25 being placed onto the power line.

In some embodiments, a bucket truck or crane can be used to install Stockfly 3 on power line 9. As noted in the abovementioned embodiments, a human worker must remove existing bolt 22 in Stockbridge damper 1 and replace it with breakaway bolt 16 prior to installation. A human worker must install Stockbridge damper(s) 1 into Stockfly 3 by opening clamp arm 107 on swingarm mechanism 100 and attaching breakaway bolt 16 to rotary impact driver 105 when Stockfly 3 is unpowered and at ground level (as described above and below). FIGS. 8 and 9 illustrate Stockfly 3 without and loaded with dampers 1, respectively. Once Stockfly 3 is loaded with dampers 1, Stockfly 3 can be powered on and lifted to the power line height using a human worker in a bucket truck or crane, as shown in FIG. 25. The bucket truck or crane can position itself and attached Stockfly 3 over power line 9. In some embodiments, Stockfly 3 can align itself with power line 9 (or guywire) using its angled frame 5 and custom shaped V wheels 11. Then, the bucket truck or crane can gently lower Stockfly 3 onto power line 9 (or guywire) as shown in FIG. 26. Stockfly 3 can be now passively stabilized by its battery 19 placement creating a low center of gravity relative to power line 9. Once Stockfly 3 is on power line 9, it can use its position-controlled electric hub motors 7 to move along power line 9 and precisely position itself at the location for installation of a Stockbridge damper 1, as shown in FIG. 14. Once at the location, one of the two swingarm mechanisms 100 can rotate along direction arrow 134, as shown in FIGS. 38 and 40, into place to position damper 1 on power line 9. Once damper 1 is in position to be so installed, impact driver mechanism 105 can torque clamping mechanism 2 until breakaway bolt 16 breaks at its rated breakaway torque (as shown in FIGS. 40 to 42 and described in more detail below). When breakaway bolt 16 breaks, swingarm mechanism 100 can rotate away along direction 133 from the installed damper 1, which can then be released from spring-loaded retaining clamp 132 (as shown in FIGS. 43 to 44 and described in more detail below). Once swingarm mechanism 100 is clear of the installed damper 1, Stockfly 3 can lift frame 5 and swingarm mechanism 100 clear of the installed damper 1 using its lifting mechanism 6, as shown in FIGS. 15 to 18 and 43 to 44 and described in more detail below. In some embodiments, Stockfly 3 can then drive over the installed damper 1 to proceed and install the remaining dampers 1 in its inventory on power line 9 using the same process described above. When Stockfly 3 has no remaining dampers 1 in its inventory or has installed all the required dampers 1, then the human in the bucket truck or crane can lift Stockfly 3 off power line 9 (or guywire) and safely lower it down to ground level to repeat the entire process.

Figure 16:
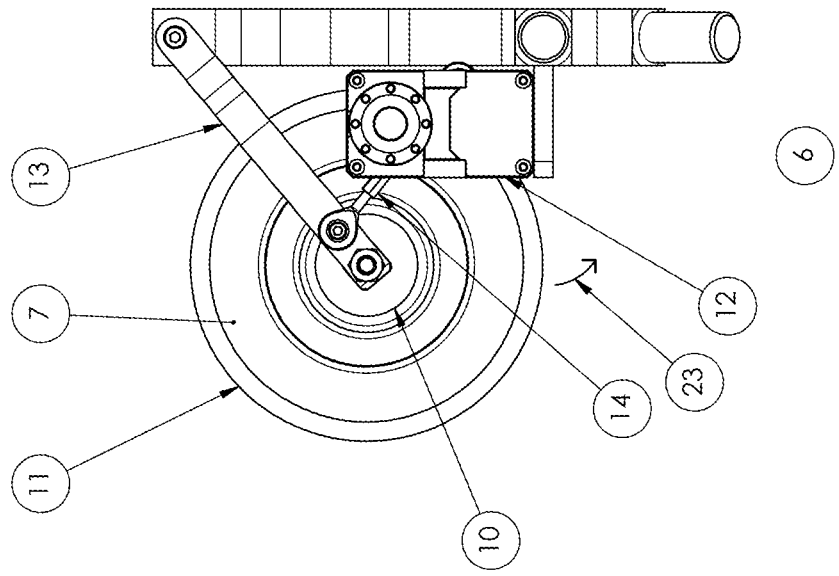
FIG. 16 is a close-up, side elevation view depicting the lifting mechanism of FIG. 15 in a raised position.
Figure 15:
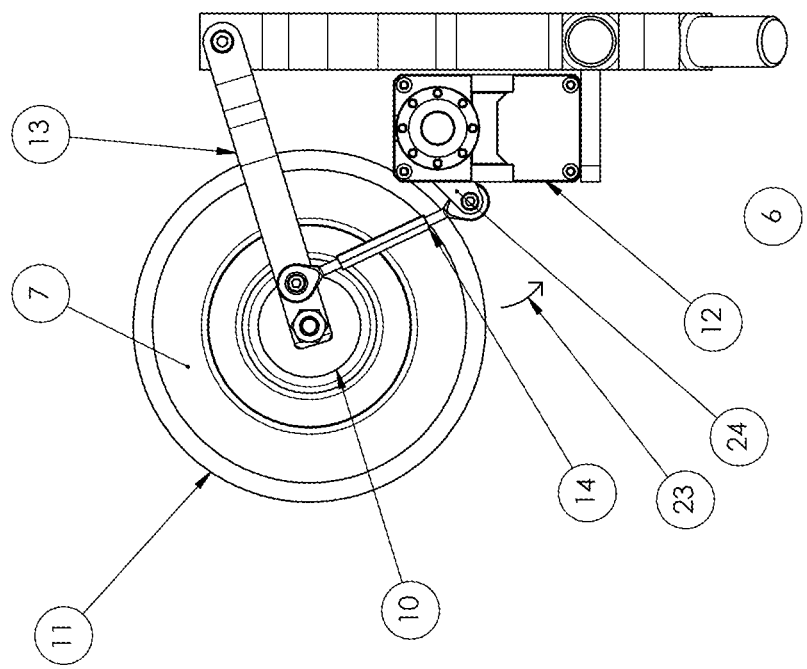
FIG. 15 is a close-up, side elevation view depicting a lifting mechanism for the robotic Stockbridge damper installer in a lowered position.
Figure 18:
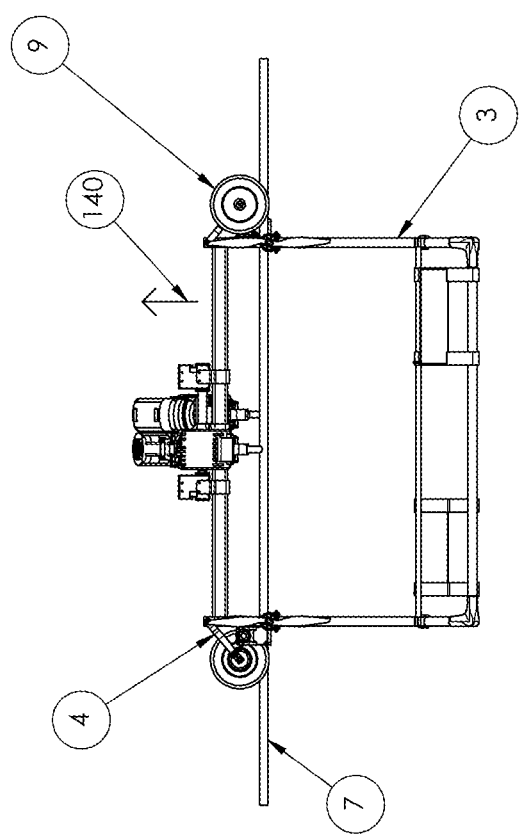
FIG. 18 is a side elevation view depicting the robotic Stockbridge damper installer of FIG. 17 in a raised position on a power line.
Figure 17:
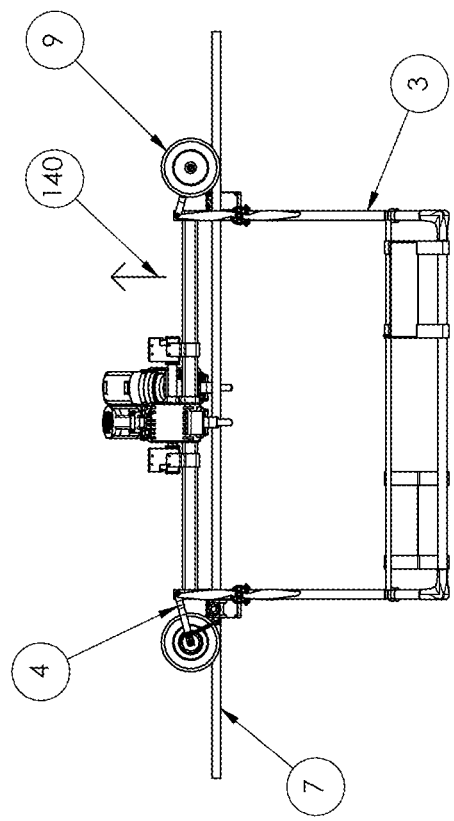
FIG. 17 is a side elevation view depicting the robotic Stockbridge damper installer in a lowered position on a power line.
Figure 20:
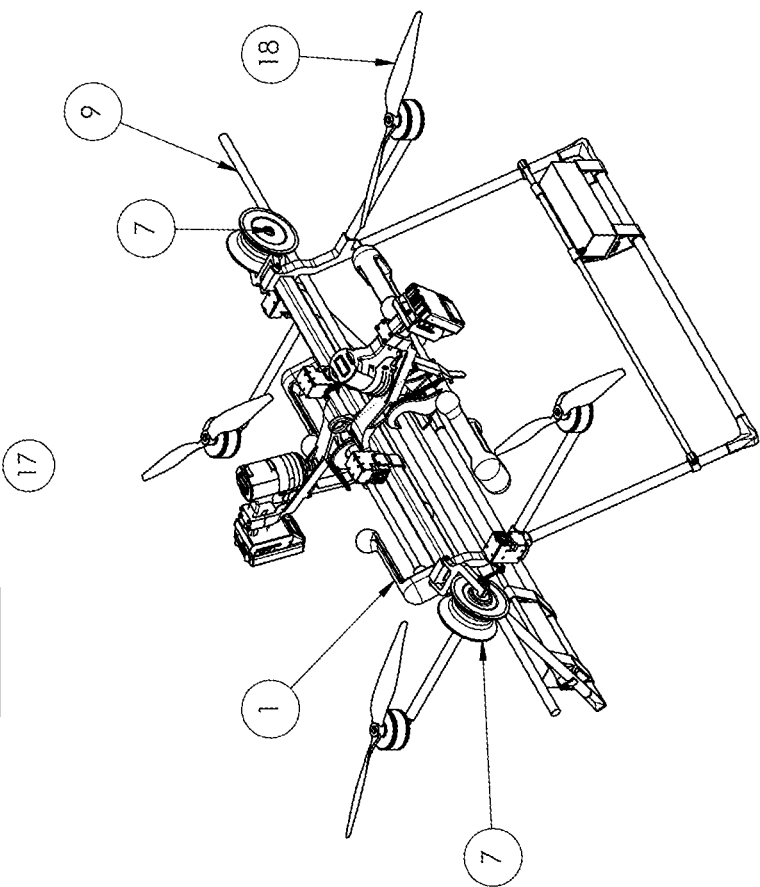
FIG. 20 is a perspective view depicting the robotic Stockbridge damper installer of FIG. 19 after being placed on the power line.
Figure 19:
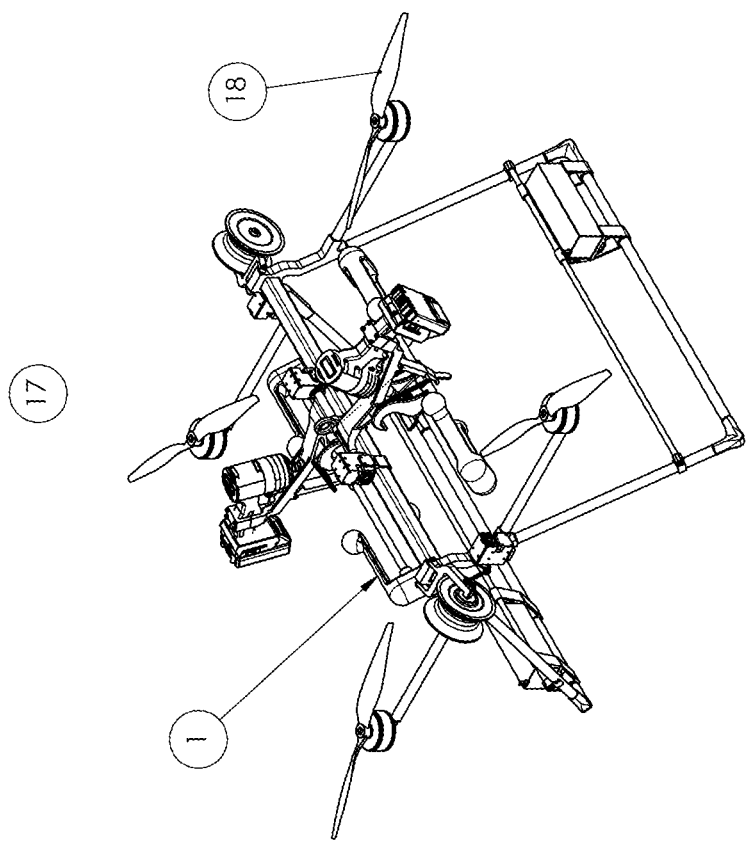
FIG. 19 is a perspective view depicting a robotic Stockbridge damper installer prior to being placed on a power line.
Figure 22:
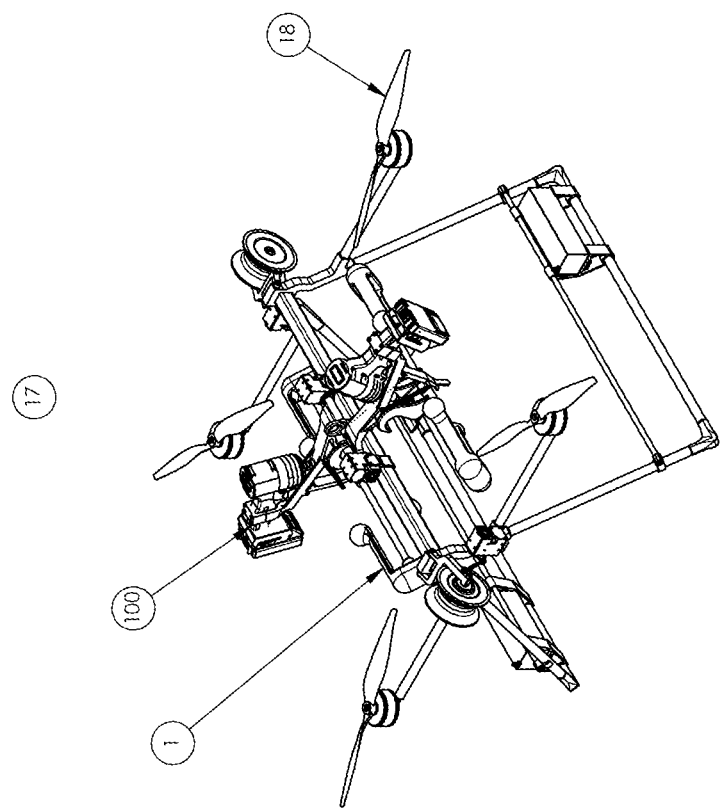
FIG. 22 is a perspective view depicting the robotic Stockbridge damper installer of FIG. 21 loaded with Stockbridge dampers.
Figure 21:
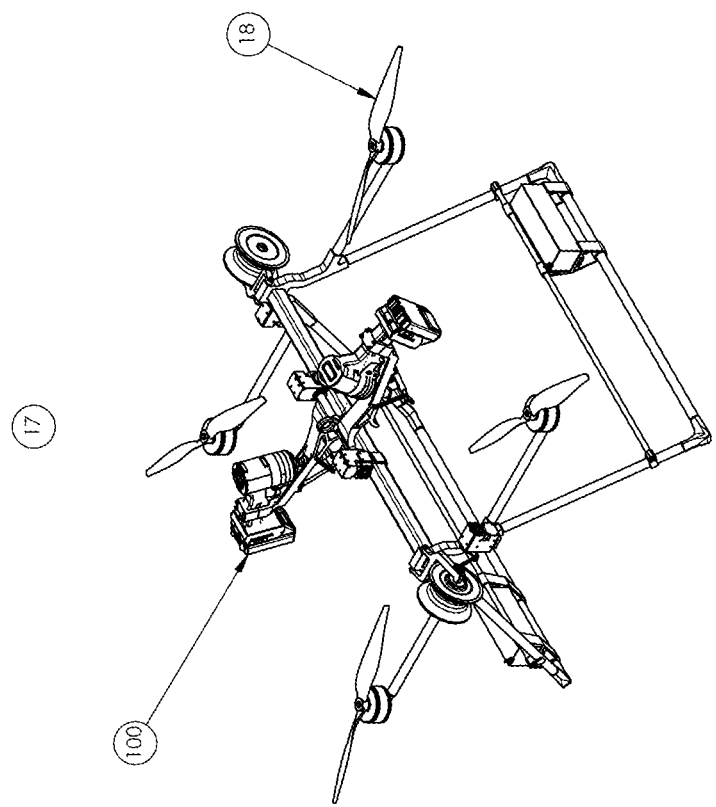
FIG. 21 is a perspective view depicting a robotic Stockbridge damper installer not loaded with Stockbridge dampers.
Figure 24:
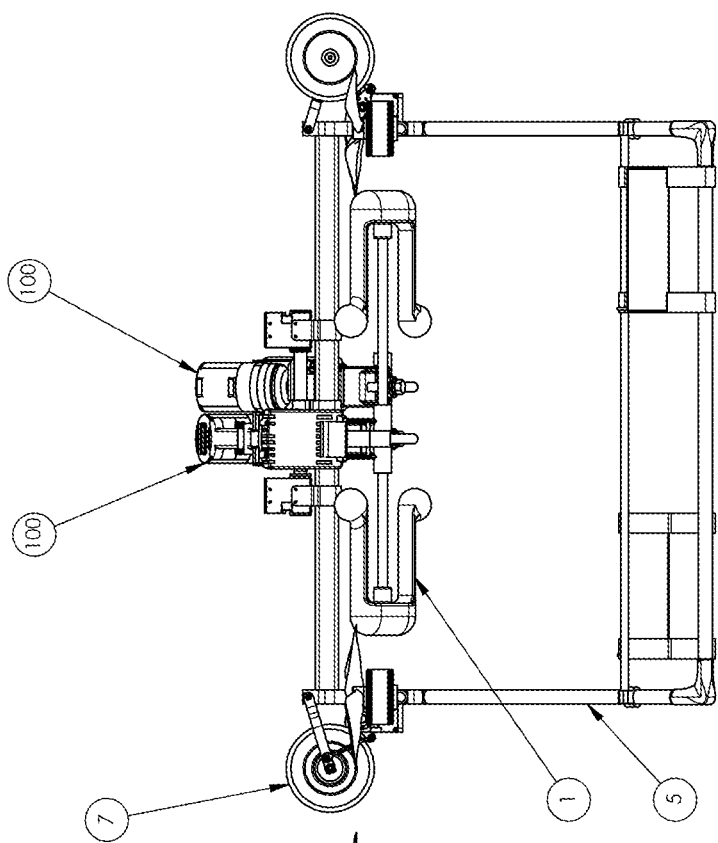
FIG. 24 is a side elevation view depicting the robotic Stockbridge damper installer of FIG. 22.
Figure 23:
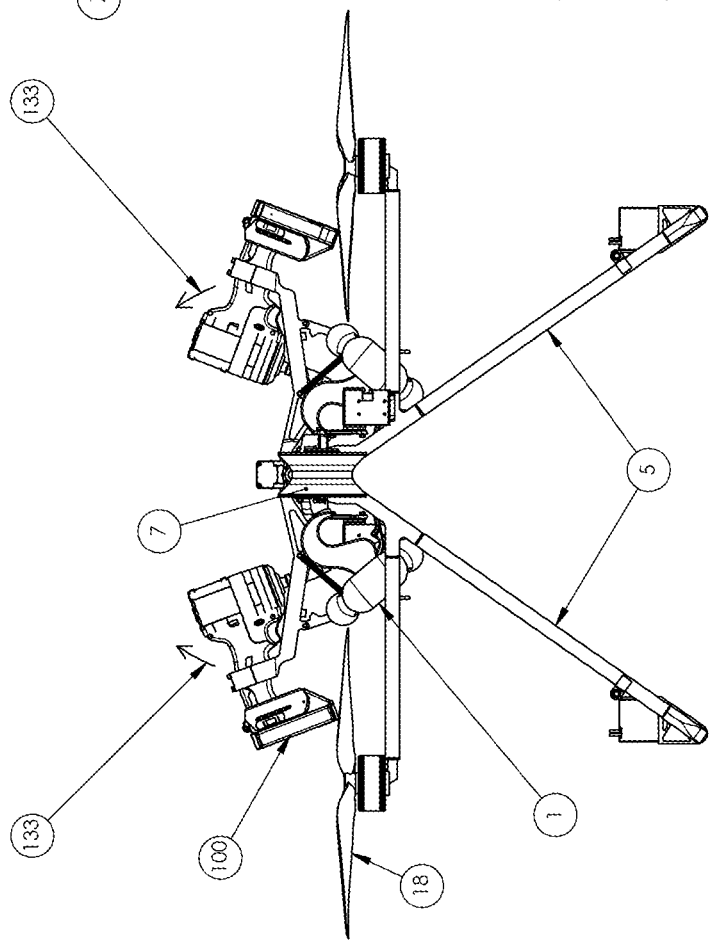
FIG. 23 is an end elevation view depicting the robotic Stockbridge damper installer of FIG. 22.

In some embodiments, servo 12 can rotate rigidly attached servo arm 24 pulling on linkage 14 that can move 23 pivoting arm 13 that can be rotationally attached to Stockfly frame 5 changing the position of drive wheels 7, as shown in FIGS. 15 and 16. This mechanism can raise the height of Stockfly frame 5 relative to power line 9, as shown in FIGS. 17 and 18, that can allow Stockfly 3 to drive over Stockbridge dampers 1 after they are installed on power line 9 to continue installing dampers 1 thereon.

Figure 28:
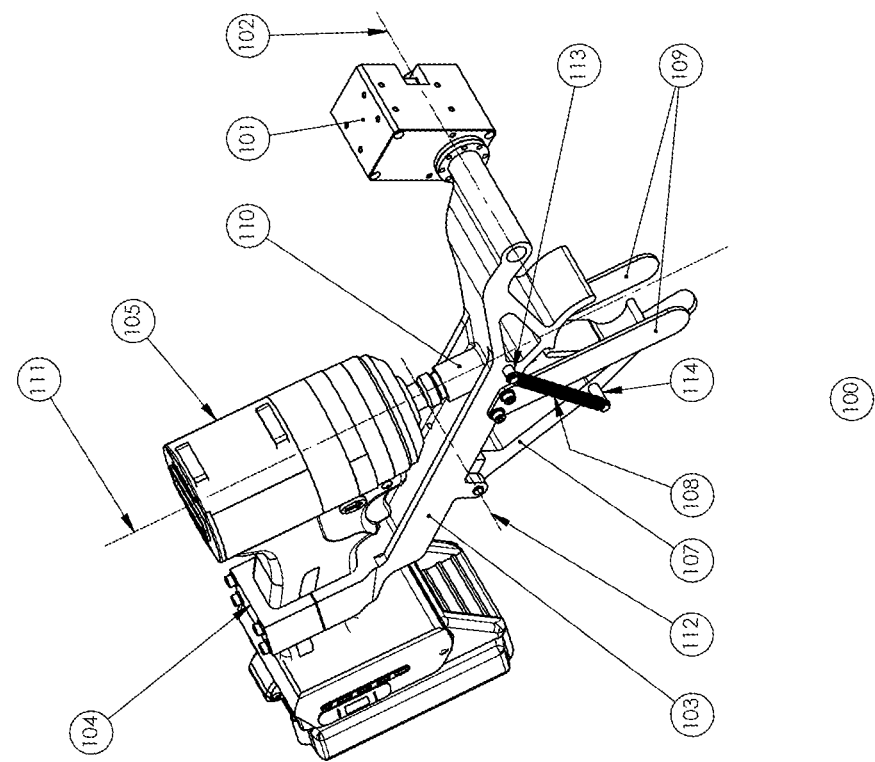
FIG. 28 is a perspective view depicting the swingarm mechanism of FIG. 27.
Figure 27:
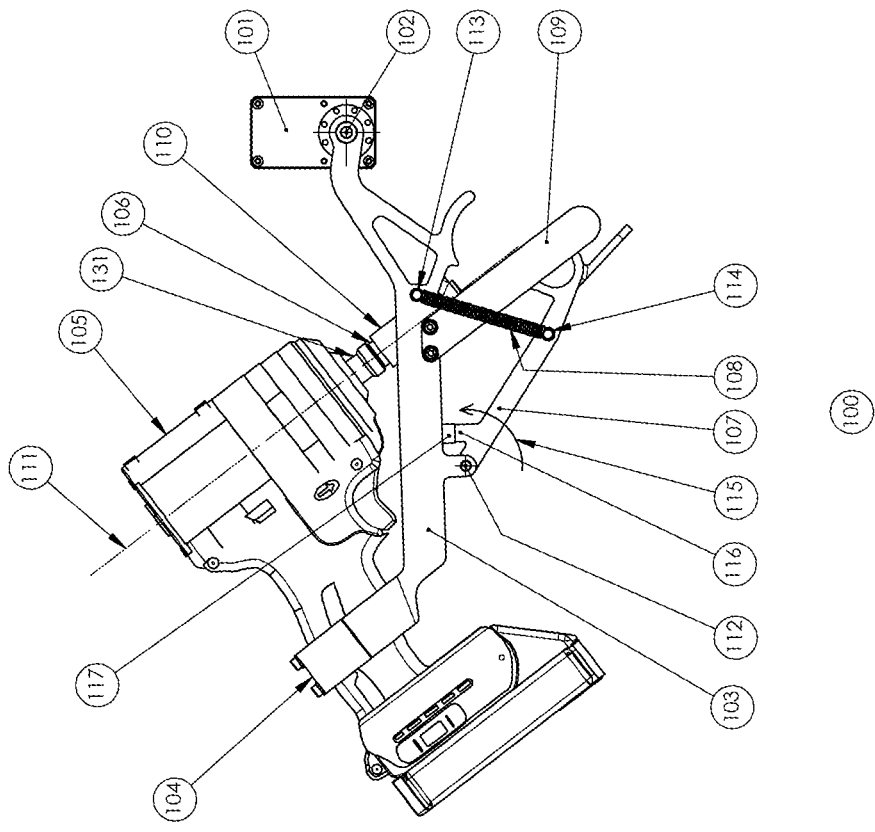
FIG. 27 is a side elevation view depicting a swingarm mechanism for a robotic Stockbridge damper installer.

FIGS. 27 and 28 illustrate side and perspective views of swingarm mechanism 100 and servo 101. In some embodiments, swingarm mechanism 100 can comprise of swingarm 103, clamp block 104, rotary impact driver 105, socket 106, clamp arm 107, one or more tension springs 108 and one or more guide wings 109. In some embodiments, rotary impact driver 105 can be forcibly clamped to the extremity of swingarm 103 with clamp block 104 as shown. Rotary impact driver 105 can be any suitably configured handheld rotary driver that has the ability to develop sufficient torque, for example, the M18 FUEL™ ¼" Hex Impact Driver manufactured by Milwaukee Electric Tool Corporation of Brookfield, Wisconsin can be used. In some embodiments, output shaft 131 of rotary impact driver 105 can be fitted with socket 106, such that rotation of output shaft 131 of rotary impact driver 105 causes socket 106 to rotate. Socket 106 can be fitted within hollow cylinder 110 that can form part of swingarm 103. In some embodiments, hollow cylinder 110 can constrain socket 106 in the radial direction while allowing it to rotate about axis 111.

In some embodiments, clamp arm 107 can be pinned to the body of swingarm 103 in such a way as to allow it to rotate about axis 112. In some embodiments, one or more tension springs 108 can be fitted so that upper extremity of tension springs 108 is connected to the body of swingarm 103 with pin 113, and the lower extremity of tension springs 108 can be connected to the body of clamp arm 107 with pin 114. Thus configured, one or more tension springs 108 can provide linear force to clamp arm 107 that can result in torque being applied to clamp arm 107 in the direction indicated by arrow 115. When there is no Type 2 Stockbridge damper 118 mounted in swingarm mechanism Assembly 100, torque applied along direction 115 can cause clamp arm 107 to rotate upwards until protrusion 116 contacts bump stop 117, preventing further rotation along direction 115.

In some embodiments, swingarm mechanism 100 can be rotatably connected to the output shaft of servo 101, allowing servo 101 to rotate swingarm mechanism 100 about axis 102. Servo 101 can be rigidly mounted to Stockfly frame 5 (not shown for clarity).

Figure 29:
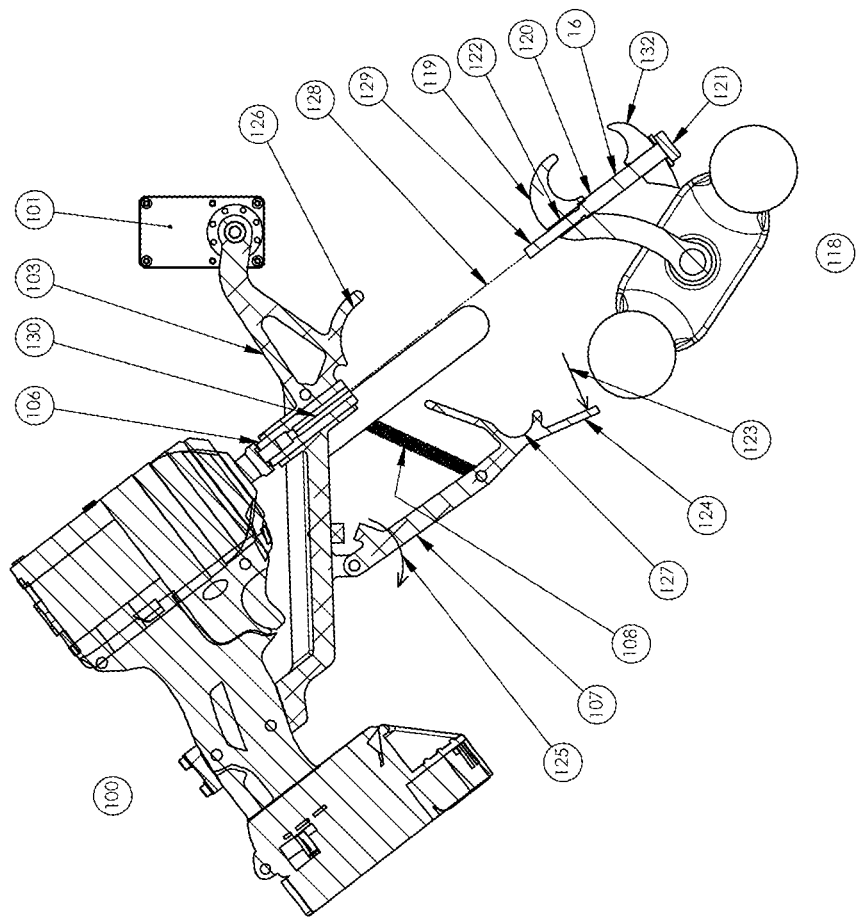
FIG. 29 is a side cross-section view depicting the swingarm mechanism of FIG. 27 prior to receiving a Type 2 Stockbridge damper therein.

FIG. 29 shows a sectioned view of swingarm mechanism 100 and Type 2 Stockbridge damper 118 prior to installing Type 2 Stockbridge damper 118 into swingarm mechanism 100. Prior to installation into swingarm mechanism 100, Type 2 Stockbridge damper 118 can be configured as shown, with clamp 132 resting against head 121 of breakaway bolt 16 and threaded section 120 of breakaway bolt 16 threaded only a small distance (between 4 and 10 mm) into female threaded hole 122 of Type 2 Stockbridge damper body 119, as shown in FIG. 29.

After Type 2 Stockbridge damper 118 is configured correctly and is ready to be installed into swingarm mechanism 100, manual force can be applied to tab 124 of clamp arm 107 along direction 123. Once the magnitude of this force is sufficient to overcome the tension force of one or more tension springs 108, clamp arm 107 can rotate along direction 125 until the gap between concave inner surface 126 of swingarm 103 and the concave inner surface 127 of clamp arm 107 is sufficient for Type 2 Stockbridge damper body 119 to be inserted into swingarm mechanism 100.

Figure 30:
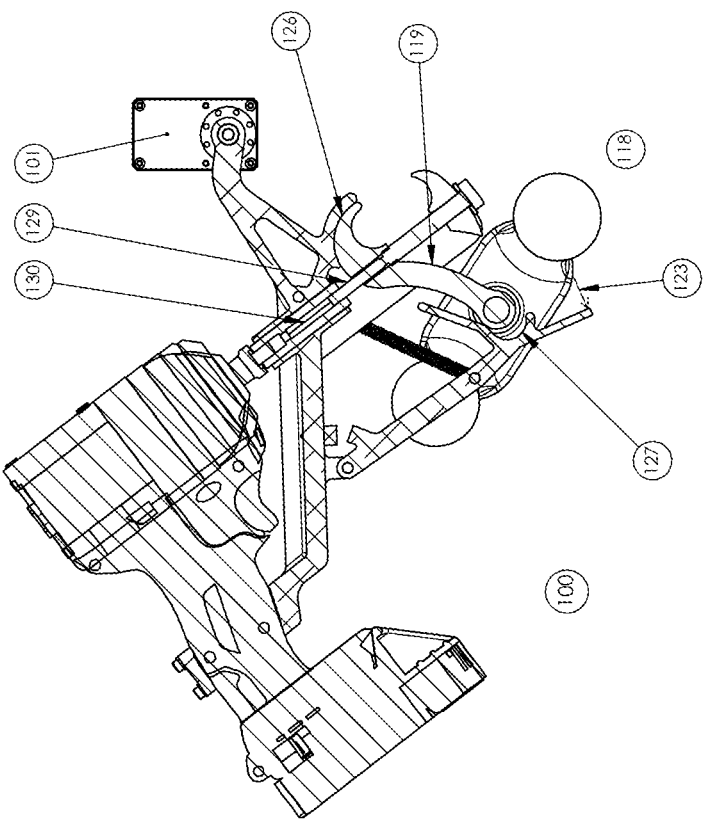
FIG. 30 is a side cross-section view depicting the swingarm mechanism of FIG. 29 with the Type 2 Stockbridge damper being installed therein.
Figure 31:
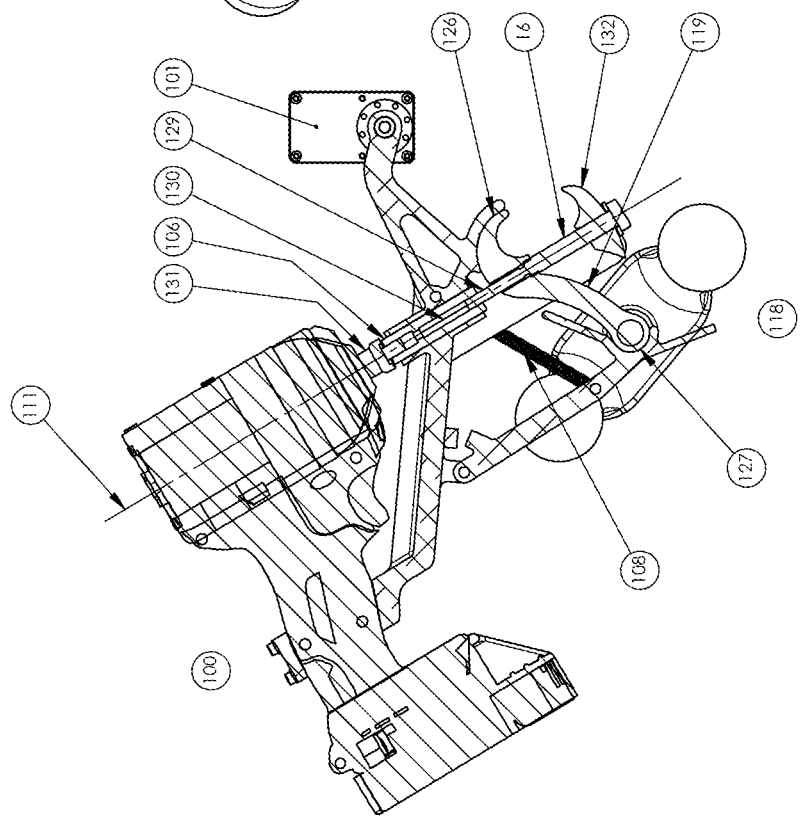
FIG. 31 is a side cross-section view depicting the swingarm mechanism of FIG. 30 after the Type 2 Stockbridge damper is installed therein.

As shown in FIGS. 29 and 30, Type 2 Stockbridge damper 118 can be then inserted into swingarm mechanism 100 by holding it in the orientation shown in FIG. 29 and moving it along direction 128 until breakaway section 129 of breakaway bolt 16 is inserted into female recess 130 of socket 106 and Type 2 Stockbridge damper body 119 makes contact with concave inner surface 126 of swingarm 103. As shown in FIG. 31, when manual force is released along direction 123, Type 2 Stockbridge damper body 119 can be trapped between concave inner surface 126 of swingarm 103 and concave inner surface 127 of clamp arm 107 by the tension force generated by the one or more tension springs 108. In some embodiments, female recess 130 of socket 106 can be shaped in such a way as to mate with the external surface of the breakaway section 129 of breakaway bolt 16 such that rotation of output shaft 131 and socket 106 can force breakaway bolt 16 to rotate about axis 111 while still allowing breakaway section 129 of breakaway bolt 16 to freely move axially within female recess 130 of socket 106.

Figure 32:
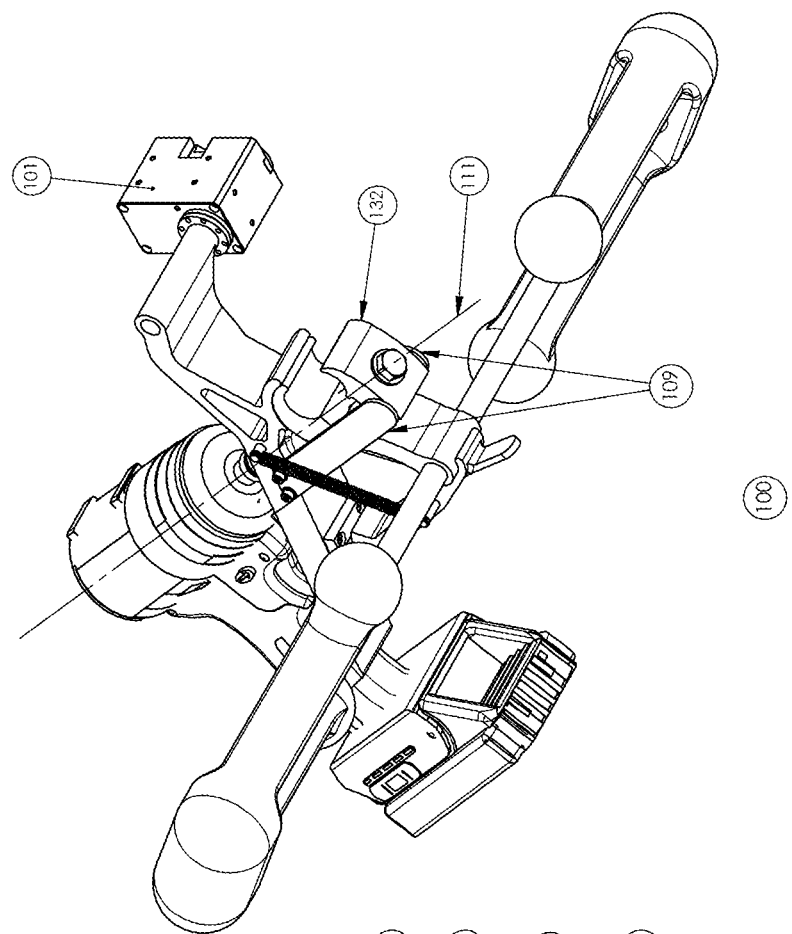
FIG. 32 is a perspective view depicting the swingarm mechanism of FIG. 31.

FIG. 32 shows a lower perspective view of Type 2 Stockbridge damper 118 mounted into swingarm mechanism 100. It can be seen that guide wing 109 can be positioned on each side of clamp 132 that can prevent clamp 132 from rotating about axis 111 during the installation procedure. Guide wings 109 also prevent Type 2 Stockbridge damper 118 from moving sideways and becoming detached from swingarm mechanism 100.

Figure 34:
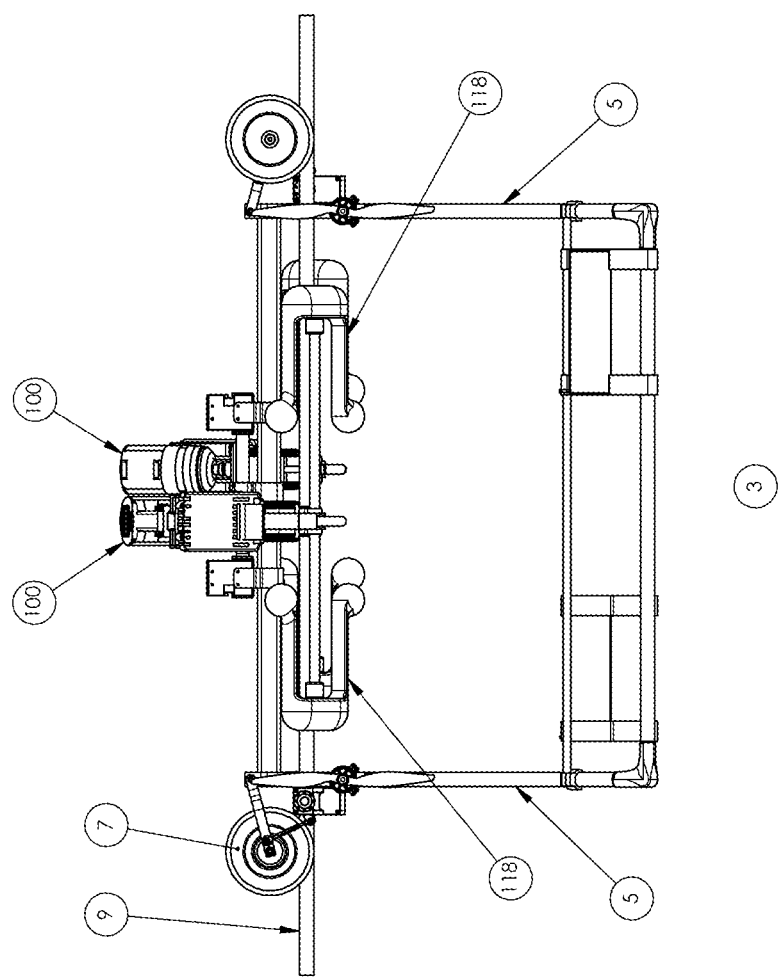
FIG. 34 is a side elevation view depicting the robotic Stockbridge damper installer of FIG. 33.
Figure 33:
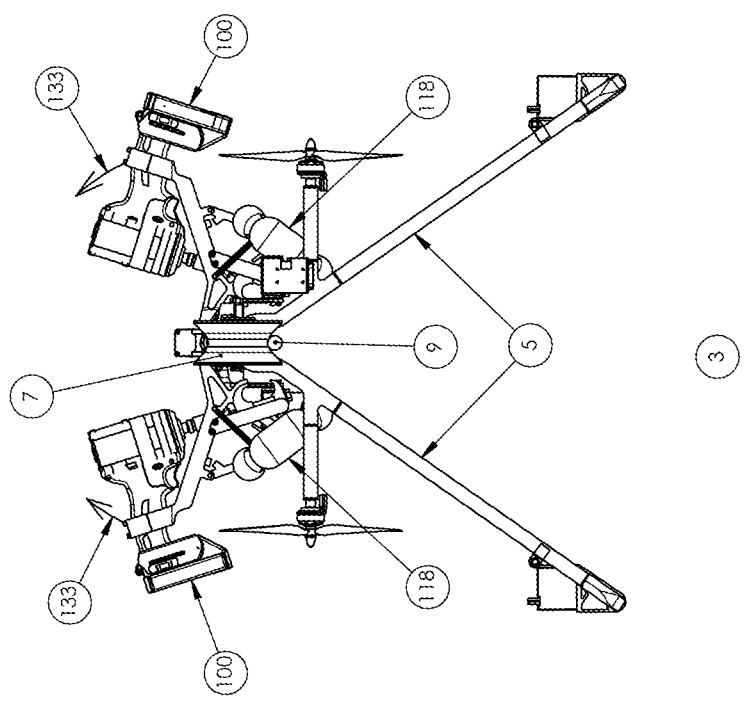
FIG. 33 is an end elevation view depicting a robotic Stockbridge damper installer loaded with Stockbridge dampers placed on a power line prior to installing the Stockbridge dampers.

Referring to FIGS. 33 and 34, end and side views of Stockfly 3 after it has been placed on power line 9 but before Stockfly 3 has begun to install a plurality of Type 2 Stockbridge dampers 118 onto power line 9. Prior to placing Stockfly 3 on power line 9, servos 101 can be used to rotate the plurality of swingarm mechanisms 100 upwards and outwards along direction 133 to the extent that power line 9 cannot make contact with the plurality of swingarm mechanisms 100 or the plurality of Type 2 Stockbridge dampers 118 as Stockfly 3 is lowered onto power line 9. Thus configured, it can be seen that the upside down Vee shape formed by Stockfly frame 5 can smoothly guide power line 9 towards Stockfly wheels 7 as the Stockfly 3 is lowered onto power line 9 without power line 9 making unwanted contact with the plurality of swingarm mechanisms 100 or the plurality of Type 2 Stockbridge dampers 118.

Figure 36:
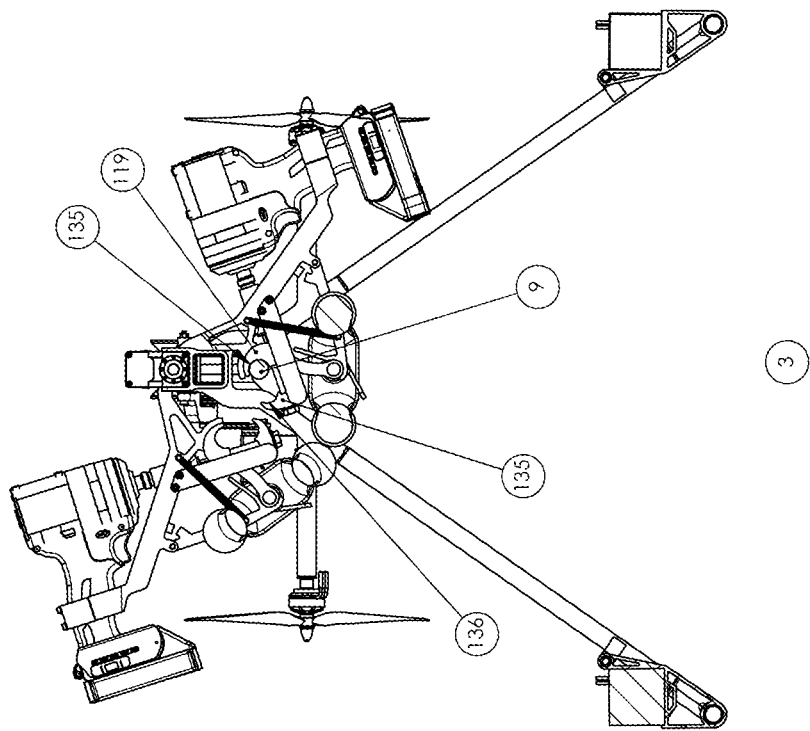
FIG. 36 is a cross-section end elevation view depicting the robotic Stockbridge damper installer of FIG. 35 with the swingarm mechanisms rotated to enable the installation of a Stockbridge damper on the power line.
Figure 35:
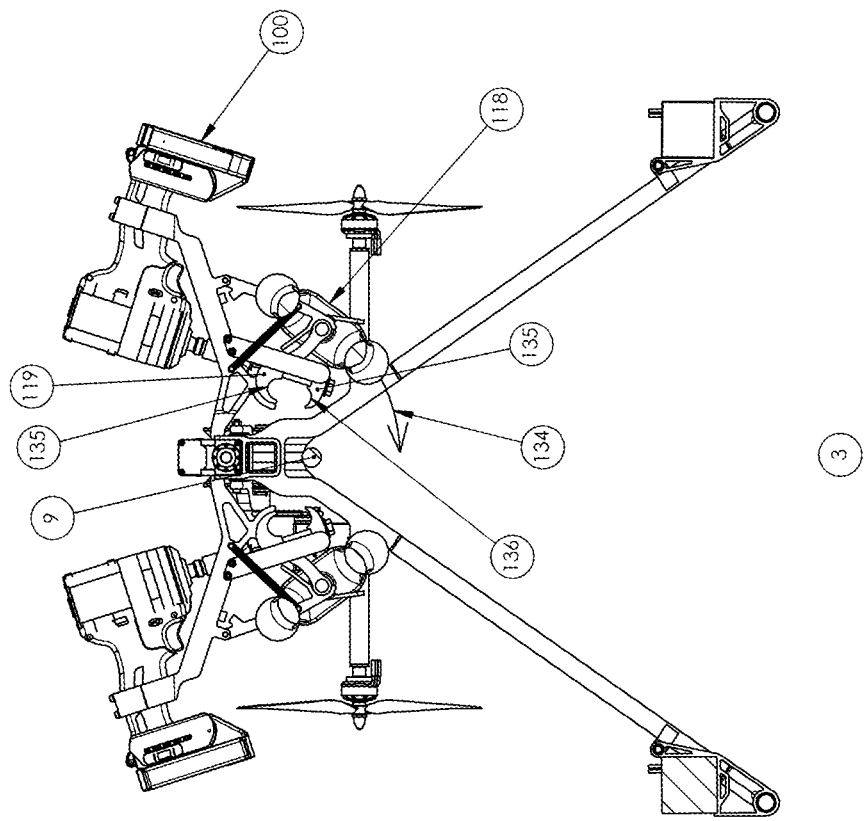
FIG. 35 is a cross-section end elevation view depicting the robotic Stockbridge damper installer of FIG. 33.

Referring to FIG. 35, a sectioned view of Stockfly 3 is provided in the same configuration as that shown in FIGS. 33 and 34. Internal detail can be observed in FIG. 35, and it can be seen that by actuating servo 101 of one of the plurality of swingarm mechanisms 100 such that swingarm mechanism 100 can rotate downwards and inwards along direction 134, power line 9 can be positioned into the empty space located between concave surface 135 of Type 2 Stockbridge damper body 119 and concave surface 136 of clamp 132. FIG. 36 shows the configuration of Stockfly 3 after this motion has occurred. It can be seen that in this configuration, power line 9 can be positioned in the empty space located between concave surface 135 of Type 2 Stockbridge damper body 119 and concave surface 136 of clamp 132.

Figure 37:
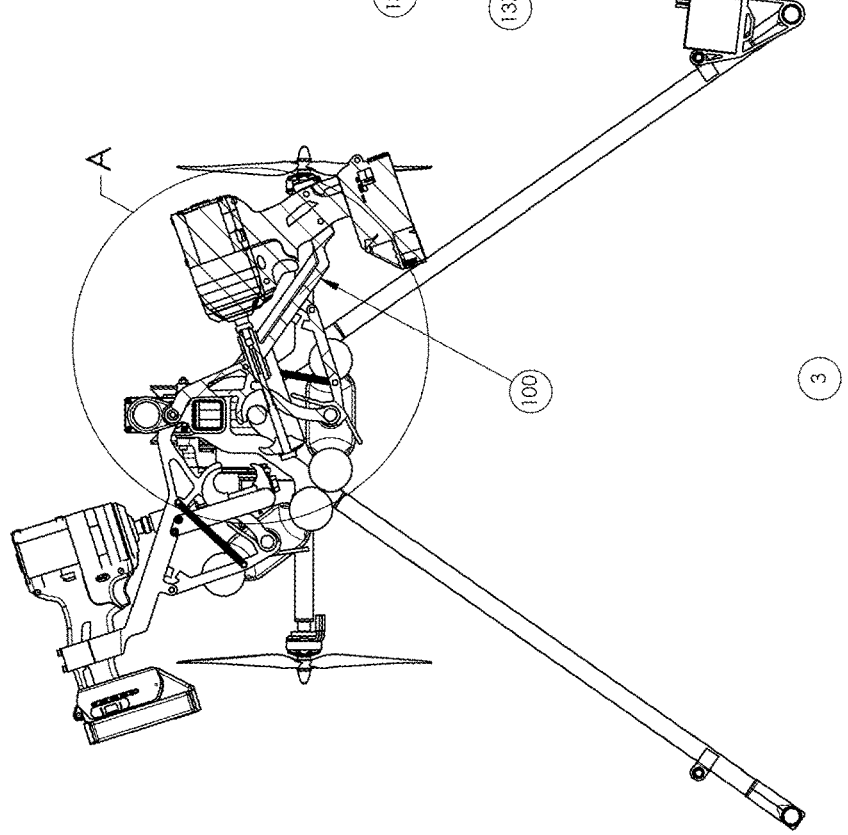
FIG. 37 is a cross-section end elevation view depicting the robotic Stockbridge damper installer of FIG. 36 starting the installation of the Stockbridge damper on the power line.

FIG. 37 shows a sectioned view of Stockfly 3 in the same configuration as depicted in FIG. 36, just prior to the clamping process that is employed to clamp power line 9 between concave surface 135 of Type 2 Stockbridge damper body 119 and concave surface 136 of clamp 132 that can firmly attach Type 2 Stockbridge damper 118 to power line 9. The section plane of FIG. 37 is located at the center of swingarm mechanism 100 that coincides with axis 111, which is the rotational axis of breakaway bolt 16, socket 106 and output shaft 131 of rotary impact driver 105.

FIG. 38 shows a magnified view of the equipment used to perform the clamping process. To perform the clamping process, rotary impact driver 105 can be activated remotely so that output shaft 131 rotates in such a way as to cause socket 106 to rotate in the correct direction so as to rotate breakaway bolt 16 in such a way as to cause threaded section 120 of breakaway bolt 16 to thread into female threaded hole 122 of Type 2 Stockbridge damper body 119 along direction 137. This action causes breakaway section 129 to move into female recess 130 of socket 106 along direction 137, while simultaneously causing head 121 of breakaway bolt 16 to press on clamp 132 and force it to move along direction 137. Guide wings 109 located on either side of clamp 132 prevent clamp 132 from rotating about axis 111 during this operation.

Figure 39:
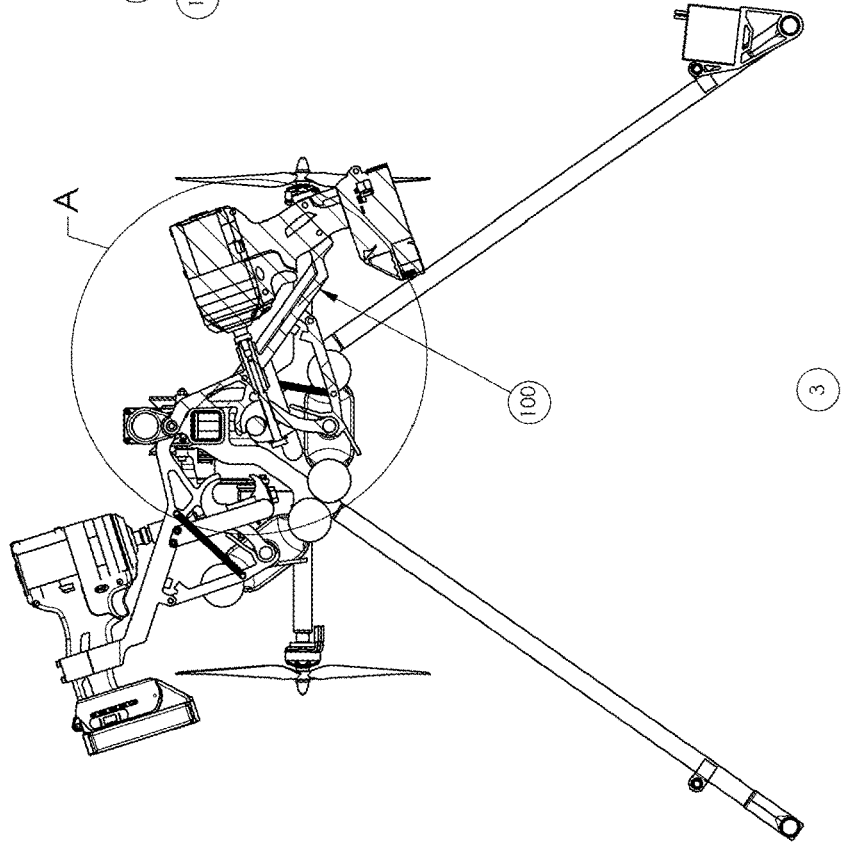
FIG. 39 is a cross-section end elevation view depicting the robotic Stockbridge damper installer of FIG. 37 tightening the Stockbridge damper on the power line.

The clamping process is continued until power line 9 is firmly trapped between concave surface 135 of Type 2 Stockbridge damper body 119 and concave surface 136 of clamp 132, as shown in FIG. 39, and corresponding magnified view shown in FIG. 40. In these figures, it can be seen that breakaway section 129 of breakaway bolt 16 has moved axially into female recess 130 of socket 106 and threaded section 120 of breakaway bolt 16 has threaded axially into female threaded hole 122 of Type 2 Stockbridge damper body 119. Once configured, it can be seen that further application of torque to breakaway bolt 16 by output shaft 131 of rotary impact driver 105 acting on socket 106 will cause head 121 of breakaway bolt 16 to press on clamp 132 and force it against both power line 9 and the body of Type 2 Stockbridge damper body 119 at interface 138. The magnitude of this clamping force rises as more torque is applied to breakaway bolt 16 by rotary impact driver 105. When torque on breakaway bolt 16 rises to a predetermined value, necked down section 139 of breakaway bolt 16 has been carefully sized to mechanically fail at the correct torque level which separates breakaway bolt 16 into two segments and prevents any further torque from being applied to breakaway bolt 16 by rotary impact driver 105.

Once breakaway bolt 16 has broken into two segments and Type 2 Stockbridge damper 118 is firmly attached to power line 9, it is necessary to move swingarm mechanism 100 away from the installed Type 2 Stockbridge damper 118 to allow Stockfly 3 to either be removed from power line 9 or to travel down the length of power line 9 to where the next position where another Type 2 Stockbridge damper 118 needs to be installed. The first step in this procedure is shown in FIG. 41 and corresponding magnified view shown in FIG. 42. In this step, Stockfly lifting mechanism 6 can be used to slightly lift Stockfly frame 5 along direction 140 such that there is adequate clearance between concave inner surface 126 of swingarm 103 and convex upper surface 141 of Type 2 Stockbridge damper body 119 for swingarm mechanism 100 to be rotated with servo 101 along direction 133. As this lifting motion proceeds, it can be seen that breakaway section 129 that broke away from breakaway bolt 16 in the previous step is retained in female recess 130 of socket 106.

After this lifting motion is complete, swingarm mechanism 100 can be rotated with servo 101 along direction 133. As this motion proceeds, it can be seen that concave inner surface 127 of clamp arm 107 can cam over convex lower surface 141 of Type 2 Stockbridge damper 118, which can cause clamp arm 107 to rotate slightly along direction 125 against the tension force of one or more tension springs 108. This camming motion can allow clamp arm 107 to clear convex lower surface 141 of Type 2 Stockbridge damper 118 as swingarm mechanism 100 is rotated along direction 133. This motion of swingarm mechanism 100 indicated by Arrow 133 until swingarm mechanism 100 is in the position shown in FIG. 43 and corresponding magnified view shown in FIG. 44.

Referring to FIGS. 43 and 44, it can be seen that as the rotary motion of swingarm mechanism 100 travels along direction 133, clamp arm 107 can rotate upwards due to the tension force being supplied by one or more tension springs 108 along direction 143 until retaining arm 142 presses against the lower surface of breakaway section 129 that can prevent breakaway section 129 from falling out of female recess 130 of socket 106 during subsequent operations. After the rotary motion of swingarm mechanism 100 along direction 133 is complete, Stockfly lifting mechanism 6 can be used to further lift Stockfly frame 5 along direction 140 until there is ample clearance between Stockfly frame 5 and Type 2 Stockbridge damper 118 to allow Stockfly 3 to move axially along power line 9 until it reaches the next install position.

The actions depicted in FIGS. 33 to 44 and described therein can be repeated with any remaining swingarm mechanisms 100 until the remaining Type 2 Stockbridge dampers 118 have been installed. Stockfly 3 can then be returned to the ground for reloading and the process can be repeated as required.

Figure 46:
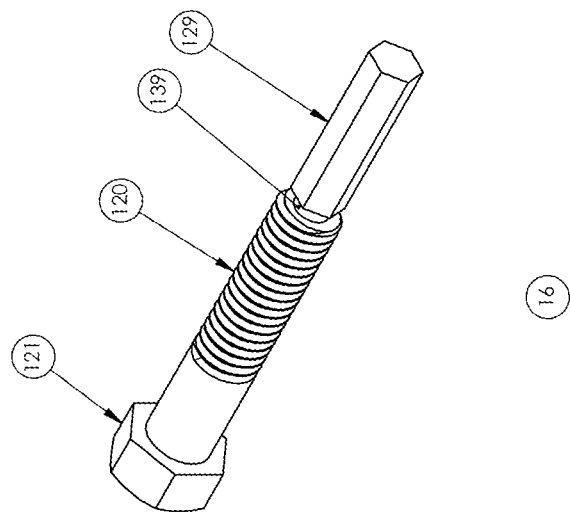
FIG. 46 is a perspective view depicting the breakaway bolt of FIG. 45.
Figure 45:
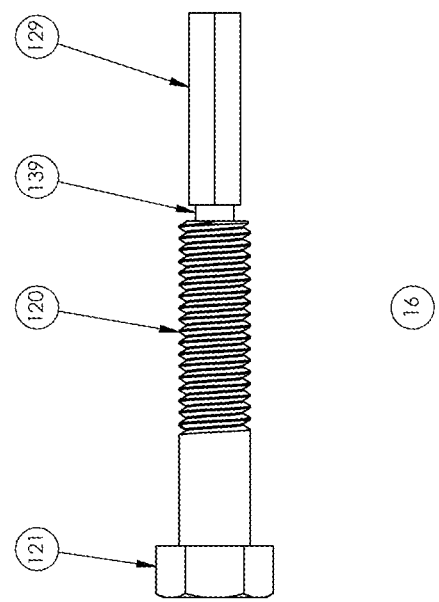
FIG. 45 is a side elevation view depicting a breakaway bolt used to clamp a Stockbridge damper on a power line.

Breakaway bolt 16 must be used with Type 1 Stockbridge dampers 1 and Type 2 Stockbridge damper 118 to enable the Type 1 and Type 2 Stockbridge dampers to be installed on power line 9 with Stockfly 3. FIG. 45 depicts a side view of breakaway bolt 16 and FIG. 46 depicts a perspective view of breakaway bolt 16. In these figures, bolt head 121, threaded section 120, necked down section 139 and breakaway section 129 can be clearly seen. It will be noted that breakaway section 129 can comprise a hexagonal cross section to engage with a corresponding hexagonal internal cross section of female recess 130 of socket 106 (not shown). This enables socket 106 to transmit substantial rotary torque to breakaway bolt 16. It will be known by those skilled in the art that other shapes may be used without this torque transmission functionality being compromised, although a hexagonal shape has the advantage of being able to interface with appropriately sized, readily available mass produced sockets 106. Bolt head 121 is a conventional hexagonal bolt head sized to interface with appropriately sized, readily available wrenches for easy removal of the bolt if required. The diameter of necked down section 139 is carefully sized to ensure that breakaway bolt 16 will shear apart at the same moment that breakaway bolt 16 has had sufficient torque applied to it.

Figure 48:
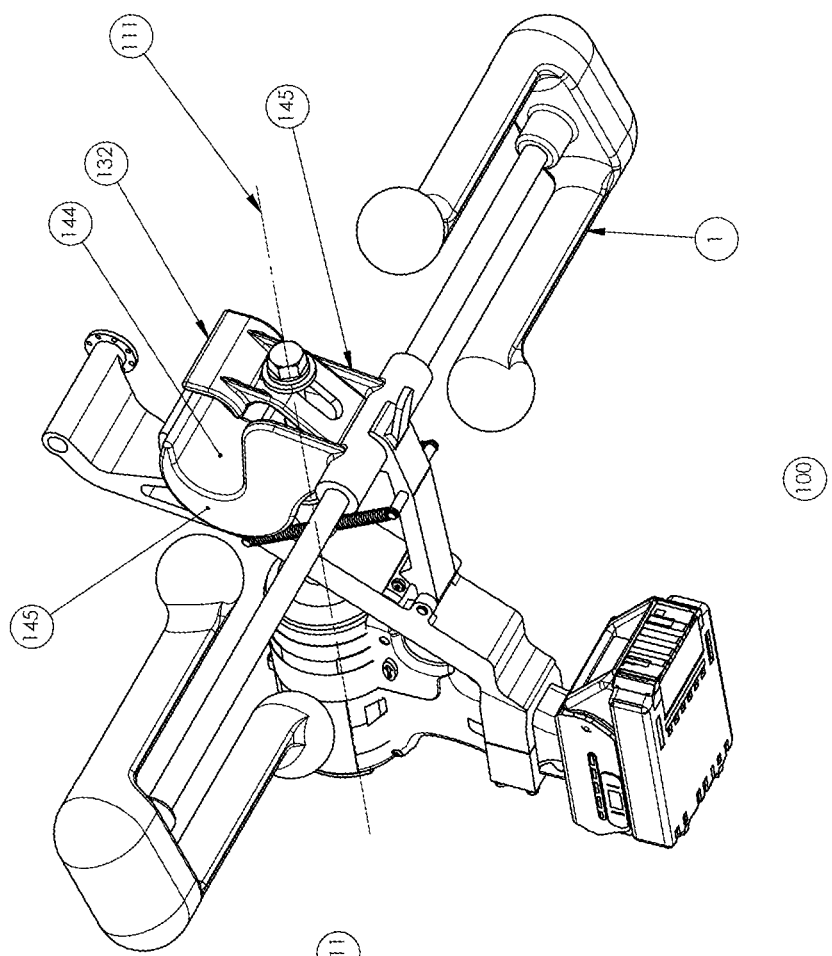
FIG. 48 is a perspective view depicting the swingarm mechanism of FIG. 47.
Figure 47:
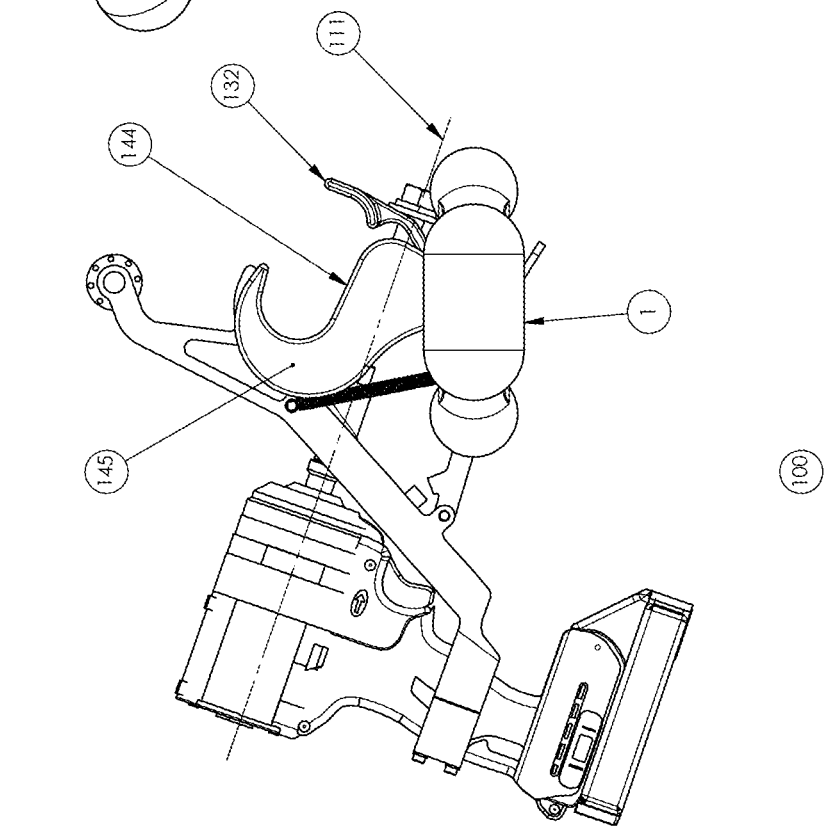
FIG. 47 is a side elevation view depicting a swingarm mechanism of a robotic Stockbridge damper installer loaded with a Type 1 Stockbridge damper.

FIGS. 47 and 48 show swingarm mechanism 100 fitted with a Type 1 Stockbridge damper 1. This mechanism and the installation procedure is functionally identical to the procedure used with Type 2 Stockbridge damper 118, but guide wings 109 are not required for the Type 1 Stockbridge damper 1 as Type 1 Stockbridge damper 1 is fitted with wings 145 that are integrated into Type 1 Stockbridge Damper body 144 that prevent Type 1 Stockbridge damper 1 from moving sideways and becoming detached from swingarm mechanism 100. Wings 145 located on either side of clamp 132 also prevent clamp 132 from rotating about axis 111 during the installation operation.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the embodiments described herein.

Embodiments implemented in computer software can be implemented in software, firmware, middleware, microcode, hardware description languages, or any combination thereof. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted via any suitable means including memory sharing, message passing, token passing, network transmission, etc.

The actual software code or specialized control hardware used to implement these systems and methods is not limiting of the embodiments described herein. Thus, the operation and behavior of the systems and methods were described without reference to the specific software code being understood that software and control hardware can be designed to implement the systems and methods based on the description herein.

When implemented in software, the functions can be stored as one or more instructions or code on a non-transitory computer-readable or processor-readable storage medium. The steps of a method or algorithm disclosed herein can be embodied in a processor-executable software module, which can reside on a computer-readable or processor-readable storage medium. A non-transitory computer-readable or processor-readable media includes both computer storage media and tangible storage media that facilitate transfer of a computer program from one place to another. A non-transitory processor-readable storage media can be any available media that can be accessed by a computer. By way of example, and not limitation, such non-transitory processor-readable media can comprise RAM, ROM, EEPROM, CD-ROM or other optical disk storage, magnetic disk storage or other magnetic storage devices, or any other tangible storage medium that can be used to store desired program code in the form of instructions or data structures and that can be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and/or instructions on a non-transitory processor-readable medium and/or computer-readable medium, which can be incorporated into a computer program product.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. A method for installing a Stockbridge damper onto a longitudinal length of a wire, the method comprising:
   a) placing a robotic Stockbridge damper installer on the wire, the robotic Stockbridge damper installer comprising:
      i) a frame configured to straddle the wire when placed thereupon, the frame further comprising opposing frame members extending downwardly therefrom,
      ii) a pair of motorized wheels configured to traverse along the wire, each of the motorized wheels comprising an electric hub motor disposed therein,
      iii) a lifting mechanism operatively coupling the pair of motorized wheels to the frame, the lifting mechanism configured to raise and lower the frame relative to the wire,
      iv) at least one swingarm mechanism operatively coupled to the frame, the at least one swingarm mechanism configured to hold the at least one Stockbridge damper and further configured to rotate the at least one Stockbridge damper towards the wire for installation thereupon, and
      v) a battery configured to provide direct current ("DC") power, the battery operatively coupled to the pair of motorized wheels, to the lifting mechanism, and to the at least one swingarm mechanism to provide DC power thereto,
      the robotic Stockbridge damper installer further configured to traverse along the longitudinal length of the wire, the robotic Stockbridge damper installer configured to hold at least one Stockbridge damper, the robotic Stockbridge damper installer loaded with the at least one Stockbridge damper;
   b) moving the robotic Stockbridge damper installer along the longitudinal length of the wire; and
   c) installing the at least one Stockbridge damper on the wire with the robotic Stockbridge damper installer at pre-determined locations on the wire.

2. The method as set forth in claim 1, further comprising lifting the robotic Stockbridge damper installer from the wire after the robotic Stockbridge damper installer has installed the at least one Stockbridge damper onto the wire.

3. The method as set forth in claim 2, further comprising returning the robotic Stockbridge damper installer to the ground surface.

4. The method as set forth in claim 3, further comprising re-loading one or more of the at least one Stockbridge damper onto the robotic Stockbridge damper installer and repeating the steps of claim 1.

5. The method as set forth in claim 1, further comprising placing the robotic Stockbridge damper installer onto the wire with a lifter.

6. The method as set forth in claim 5, wherein the lifter comprises one or more of an unmanned aerial vehicle, a crane and a bucket truck.

7. The method as set forth in claim 1, wherein the wire comprises an electric power line or a guy wire.

8. The method as set forth in claim 1, wherein the lifting mechanism comprises:
   a) a first DC electric servo motor operatively coupled to the frame, the first DC electric servo motor comprising a servo arm operatively coupled thereto;
   b) a pivot arm operatively coupling one of the pair of motorized wheels to the frame; and
   c) a linkage operatively coupling the pivot arm to the servo arm, wherein operation of the first DC electric servo motor causes the servo arm to rotate and move the pivot arm towards or away from the frame to thereby raise or lower the frame.

9. The method as set forth in claim 8, wherein the at least one swingarm mechanism comprises:
   a) a second DC electric servo motor disposed on the frame;
   b) a swingarm pivotally coupled to the second DC electric servo motor;
   c) a clamp arm pivotally coupled to the swingarm, the combination of the swingarm and the clamp arm configured to hold one of the at least one Stockbridge damper, the clamp arm further comprising a biasing member configured to pivot the clamp arm towards the swingarm; and
   d) a rotary impact driver operatively coupled to the swingarm, the rotary impact driver configured to clamp the at least one Stockbridge damper onto the wire when the at least one swingarm mechanism is rotated to install the at least one Stockbridge damper onto the wire.

10. The method as set forth in claim 9, wherein the at least one Stockbridge damper comprises a clamp with a breakaway bolt configured to tighten the clamp onto the wire, and the rotary impact driver comprises a socket configured to rotationally engage a breakaway section disposed on the breakaway bolt, whereupon operation of the rotary impact driver rotates the breakaway bolt to tighten the clamp to the wire until the breakaway section shears off of the breakaway bolt at a predetermined torque.

11. A system for installing at least one Stockbridge damper onto a longitudinal length of a wire, the system comprising:
   a) a frame configured to straddle the wire when placed thereupon, the frame further comprising opposing frame members extending downwardly therefrom;
   b) a pair of motorized wheels configured to traverse along the wire, each of the motorized wheels comprising an electric hub motor disposed therein;

c) a lifting mechanism operatively coupling the pair of motorized wheels to the frame, the lifting mechanism configured to raise and lower the frame relative to the wire;

d) at least one swingarm mechanism operatively coupled to the frame, the at least one swingarm mechanism configured to hold the at least one Stockbridge damper and further configured to rotate the at least one Stockbridge damper towards the wire for installation thereupon, the at least one Stockbridge damper comprising a clamp configured to fasten to the wire with a breakaway bolt wherein the breakaway bolt comprises a breakaway section configured to shear off of the breakaway bolt at a predetermined torque; and e) a battery configured to provide direct current ("DC") power, the battery operatively coupled to the pair of motorized wheels, to the lifting mechanism, and to the at least one swingarm mechanism to provide DC power thereto.

12. The system as set forth in claim 11, wherein the lifting mechanism comprises:

a) a first DC electric servo motor operatively coupled to the frame, the first DC electric servo motor comprising a servo arm operatively coupled thereto;

b) a pivot arm operatively coupling one of the pair of motorized wheels to the frame; and c) a linkage operatively coupling the pivot arm to the servo arm, wherein operation of the first DC electric servo motor causes the servo arm to rotate and move the pivot arm towards or away from the frame to thereby raise or lower the frame.

13. The system as set forth in claim 12, wherein the at least one swingarm mechanism comprises:

a) a second DC electric servo motor disposed on the frame;

b) a swingarm pivotally coupled to the second DC electric servo motor;

c) a clamp arm pivotally coupled to the swingarm, the combination of the swingarm and the clamp arm configured to hold one of the at least one Stockbridge damper, the clamp arm further comprising a biasing member configured to pivot the clamp arm towards the swingarm; and d) a rotary impact driver operatively coupled to the swingarm, the rotary impact driver configured to clamp the at least one Stockbridge damper onto the wire when the at least one swingarm mechanism is rotated to install the at least one Stockbridge damper onto the wire.

14. The system as set forth in claim 13, wherein the rotary impact driver further comprises a socket configured to rotationally engage the breakaway section disposed on the breakaway bolt, whereupon operation of the rotary impact driver rotates the breakaway bolt to tighten the clamp to the wire until the breakaway section shears off of the breakaway bolt at the predetermined torque.

15. The system as set forth in claim 11, further comprising a lifter configured to place the robotic Stockbridge damper installer on the wire.

16. The system as set forth in claim 15, wherein the lifter comprises one or more of an unmanned aerial vehicle, a crane and a bucket truck.

17. The system as set forth in claim 11, wherein the wire comprises an electric power line or a guy wire.

* * * * *